United States Patent [19]
Myers

[11] Patent Number: 6,057,753
[45] Date of Patent: May 2, 2000

[54] VIBRATIONAL TRANSDUCER

[75] Inventor: John L. Myers, Tipp City, Ohio

[73] Assignee: Projects Unlimited, Inc., Dayton, Ohio

[21] Appl. No.: 09/108,522

[22] Filed: Jul. 1, 1998

Related U.S. Application Data

[60] Provisional application No. 60/051,737, Jul. 3, 1997.

[51] Int. Cl.⁷ .................................................. H04B 3/36
[52] U.S. Cl. ..................... 340/407.1; 340/311.1; 340/825.46; 310/81
[58] Field of Search ........................ 340/407.1, 311.1, 340/825.46, 825.44; 310/90, 90.5, 81; 381/200

[56] References Cited

U.S. PATENT DOCUMENTS

| | | | |
|---|---|---|---|
| 3,538,756 | 11/1970 | Coombs | 73/91 |
| 3,623,064 | 11/1971 | Kagan | 340/311 |
| 3,911,416 | 10/1975 | Feder | 340/311 |
| 4,093,944 | 6/1978 | Muncheryan | 340/279 |
| 4,352,091 | 9/1982 | Yamasaki | 340/311 |
| 4,403,176 | 9/1983 | Cranston | 318/114 |
| 4,446,741 | 5/1984 | Sirokorad et al. | 73/654 |
| 4,553,074 | 11/1985 | Jacquemet | 318/130 |
| 4,794,392 | 12/1988 | Selinko | 340/825.46 |
| 4,811,835 | 3/1989 | Bullivant et al. | 198/762 |
| 4,833,358 | 5/1989 | Suzuki et al. | 310/316 |
| 4,864,276 | 9/1989 | Tribbey et al. | 340/311.1 |
| 4,918,438 | 4/1990 | Yamasaki | 340/825.46 |
| 5,007,105 | 4/1991 | Kudoh | 455/344 |
| 5,107,155 | 4/1992 | Yamaguchi | 340/407.1 |
| 5,153,473 | 10/1992 | Russell | 310/81 |
| 5,164,668 | 11/1992 | Alfors | 324/207.2 |
| 5,175,459 | 12/1992 | Danial et al. | 310/81 |
| 5,229,744 | 7/1993 | Ogura | 340/311.1 |
| 5,287,099 | 2/1994 | Tsunoda | 340/825.44 |
| 5,359,318 | 10/1994 | Asai | 340/311.1 |
| 5,379,032 | 1/1995 | Foster et al. | 340/825.46 |
| 5,397,949 | 3/1995 | Guardiani et al. | 310/51 |
| 5,436,622 | 7/1995 | Gutman et al. | 340/407.1 |
| 5,440,185 | 8/1995 | Allwine, Jr. | 310/156 |
| 5,469,133 | 11/1995 | Hensler et al. | 340/407.1 |
| 5,471,103 | 11/1995 | Fujii | 310/81 |
| 5,511,231 | 4/1996 | Ono | 455/38.2 |
| 5,646,589 | 7/1997 | Murray et al. | 340/825.46 |
| 5,668,423 | 9/1997 | You et al. | 340/407.1 |
| 5,798,623 | 8/1998 | El-Sadi | 312/254 |

FOREIGN PATENT DOCUMENTS

| | | |
|---|---|---|
| 57-158141 | 9/1982 | Japan . |
| WO97/07650 | 2/1997 | WIPO . |

*Primary Examiner*—Jeffery A. Hofsass
*Assistant Examiner*—Van T. Trieu
*Attorney, Agent, or Firm*—Thompson Hine & Flory LLP

[57] ABSTRACT

A vibrating transducer or alarm for a pager, cellular telephone and the like, includes a single coil wound in a longitudinal direction to enclose a chamber extending in the longitudinal direction; a planar substrate, bonded to an outer wall formed by the coil; a switching power source, operatively coupled to the coil, for producing an oscillating magnetic field within the chamber; and an eccentric weight rotor assembly extending within the chamber, where the rotor assembly includes a permanent magnet that provides a rotational force to the rotor assembly when acted upon by the oscillating magnetic field.

25 Claims, 18 Drawing Sheets

VIBRATIONAL TRANSDUCER

CROSS REFERENCE TO RELATED APPLICATIONS

This application claims priority under 35 U.S.C. §119 from Provisional Application Ser. No. 60/051,737 filed Jul. 3, 1997, the entire disclosure of which is incorporated herein by reference.

COPYRIGHTED MATERIAL

A portion of the disclosure of this patent document contains material which is subject to copyright protection. The copyright owner has no objection to the facsimile reproduction by anyone of the patent document or the patent disclosure, as it appears in the PTO patent files or records, but otherwise reserves all copyright rights whatsoever.

BACKGROUND

The present invention relates to personal communication devices, and more particularly, to a vibrational transducer or vibrating alarm for use with personal communication devices.

Vibrating alarms for use with personal communication devices are well known in the art. Many of these alarms comprise conventional motors having an eccentric weight attached to the rotor shaft. Accordingly, when the motor is activated, the rotation of the rotor shaft and corresponding rotation of the eccentric weight causes vibration within the personal communication device that is detected by the holder of the device.

A disadvantage with conventional eccentric weight motors is that they are not specifically designed for mass production. In particular, several manual labor steps are required to assemble the device. For example, the most popular conventional vibrating motors require three coils, each of which must be soldered to the associated leads by manual labor.

Additional disadvantages with conventional vibrating motors is that they are not surface mountable, i.e., that they are not specifically adapted to be surface mounted onto a circuit board of a personal communication device. For example, the most popular conventional vibrating motors require a specialized bracket which must first be mounted to the personal communication device, a male connector component which must be attached to the ends of the motor's lead wires, and a corresponding female connector which is mounted to the communication device's circuit board. First, the bracket must be mounted within the communication device, then the female connector is mounted to the circuit board, then the male connector is coupled to the wires of the motor, and finally, in an assembly process, the motor is installed into the bracket and the female and male connectors are mated.

Accordingly, a need exists for a vibrating alarm for use with a personal communication device which substantially reduces manual assembly requirements, which is specifically designed to be surface mounted onto a printed circuit board of a personal communication device, and which minimizes the energy requirements for operating the device.

SUMMARY

The present invention is a small vibrating motor for use with a personal communication device that comprises a rotor assembly mounted within a single coil wound to form a chamber therewithin for receiving the rotor assembly. The rotor assembly is mounted within the chamber by upper and lower bearing assemblies. A semi-cylindrical, or half-donut shaped magnet is coupled to the rotor assembly so that when an alternating magnetic field is supplied by the coil, the magnet is caused to move and rotate within the coil. The half donut-shaped magnet provides an eccentric weight, such that rotation of the rotor assembly within the coil causes the motor to vibrate. Of course, other eccentrically shaped magnets may also be utilized in place of the half donut-shaped magnet. The coil and rotor assembly is contained within a housing that is specifically designed to be surface mounted or PC mounted to a circuit board.

In a first embodiment, an H-bridge circuit is used to provide switched power to the motor, and a comparator circuit is used to sense the direction of motor generated Voltage (back-EMF). A microprocessor or microcontroller, operatively coupled to the H-bridge and comparator circuits, preferably uses the back-EMF signal to determine the appropriate driver input signals to apply to the H-bridge circuit. Therefore, the EMF comparator circuit is used to control the commutation in the motor.

Accordingly, one aspect of the present invention provides a vibrating transducer comprising a coil wound in a longitudinal direction to enclose a chamber extending in the longitudinal direction; a switching power source, operatively coupled to the coil, for producing an oscillating magnetic field within the chamber and a rotor assembly extending within the chamber, where the rotor assembly includes a permanent magnet and where the rotor assembly has center of mass located radially distal from its rotational axis. Another aspect of the present invention provides a communication device comprising a receiver component for receiving messages transmitted to the communications device, a processor operatively coupled to the receiver component for processing messages received by the receiver component, and a vibrating alarm operatively coupled to the processor where the vibrating alarm includes the small vibrating transducer described above.

Yet another aspect of the present invention provides a vibrating alarm for a pager, cellular telephone and the like, comprising a single coil wound in a longitudinal direction to enclose a chamber extending in the longitudinal direction; a planar substrate, bonded to an outer wall formed by the coil; a power source, operatively coupled to the coil, for producing an oscillating magnetic field within the chamber; and an eccentric weight rotor assembly mounted within the chamber, where the rotor assembly includes a permanent magnet that provides a rotational force to the rotor assembly when acted upon by the oscillating magnetic field.

Accordingly, it is an object of the present invention to provide a vibrating transducer for use with a personal communication device that significantly reduces manual labor requirements in manufacturing the transducer; it is a further object of the present invention to provide a vibrating transducer for use with a personal communication device that uses a single coil as opposed to several coils; it is a further object of the present invention to provide a vibrating transducer for use with a personal communication device that can be surface mounted to a printed circuit board; and it is a further object of the present invention to provide a vibrating transducer for a personal communication device that can transfer vibrational energy in any direction needed by simply mounting the transducer in a particular orientation.

DETAILED DESCRIPTION

Figure 1:
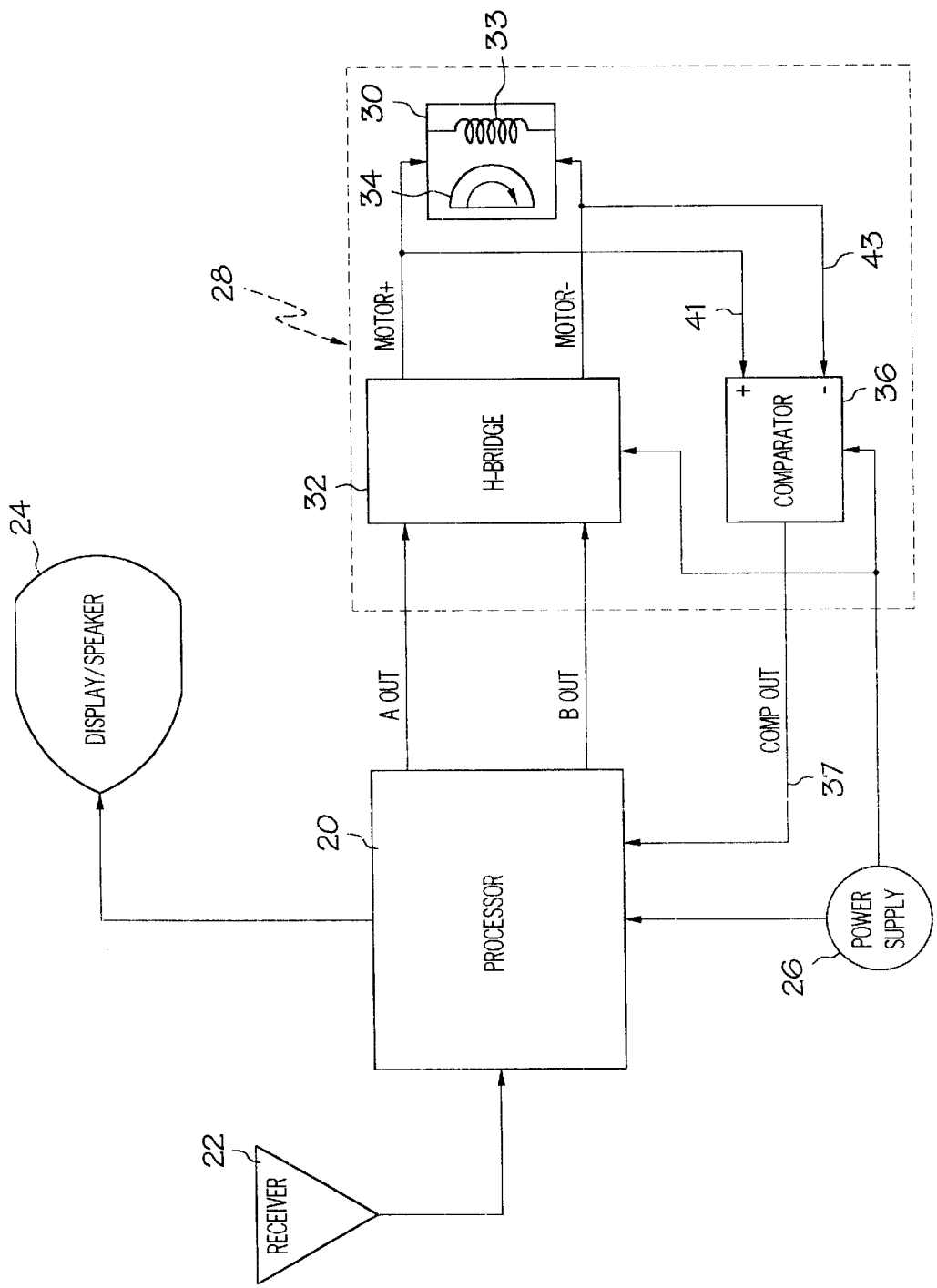
FIG. 1 is a schematic, block-diagram representation of a personal communication device incorporating the vibrating transducer of present invention.

As shown in FIG. 1, a cellular telephone, pager or other type of personal communication device will typically include a central processor 20 such as a microprocessor, microcontroller or other similar processing device; a receiver 22 such as an RF antenna, an infrared sensor, or other related reception device; an output device 24 such as an LCD or LED display component and/or a speaker component; and a power supply 26, such as a battery, a solar cell, or any other known means for providing power to the various components of the personal communication device. Such components are known to those of ordinary skill in the art and will therefore not be discussed in significant detail herein. Generally, the processor 20 receives information transmitted to the personal communication device from the receiver 22 and relays that information to the user of the personal communication device by controlling the output device 24.

The personal communication device will also include a vibrating transducer 28 of the present invention for alerting a user of the device of an incoming message, for example. The vibrating transducer 28 of the present invention includes a motor 30, and a switched power source 32. As will be described in further detail below, the motor 30 includes a coil 33 and a rotor assembly 34 extending near the coil and having a center of mass located radially distal from its rotational axis. Furthermore, the vibrating transducer 28 also preferably includes a component or a circuit, such as a comparator 36, operatively coupled to the coil 33 for detecting the direction of travel of the rotor assembly 34.

Figure 2A:
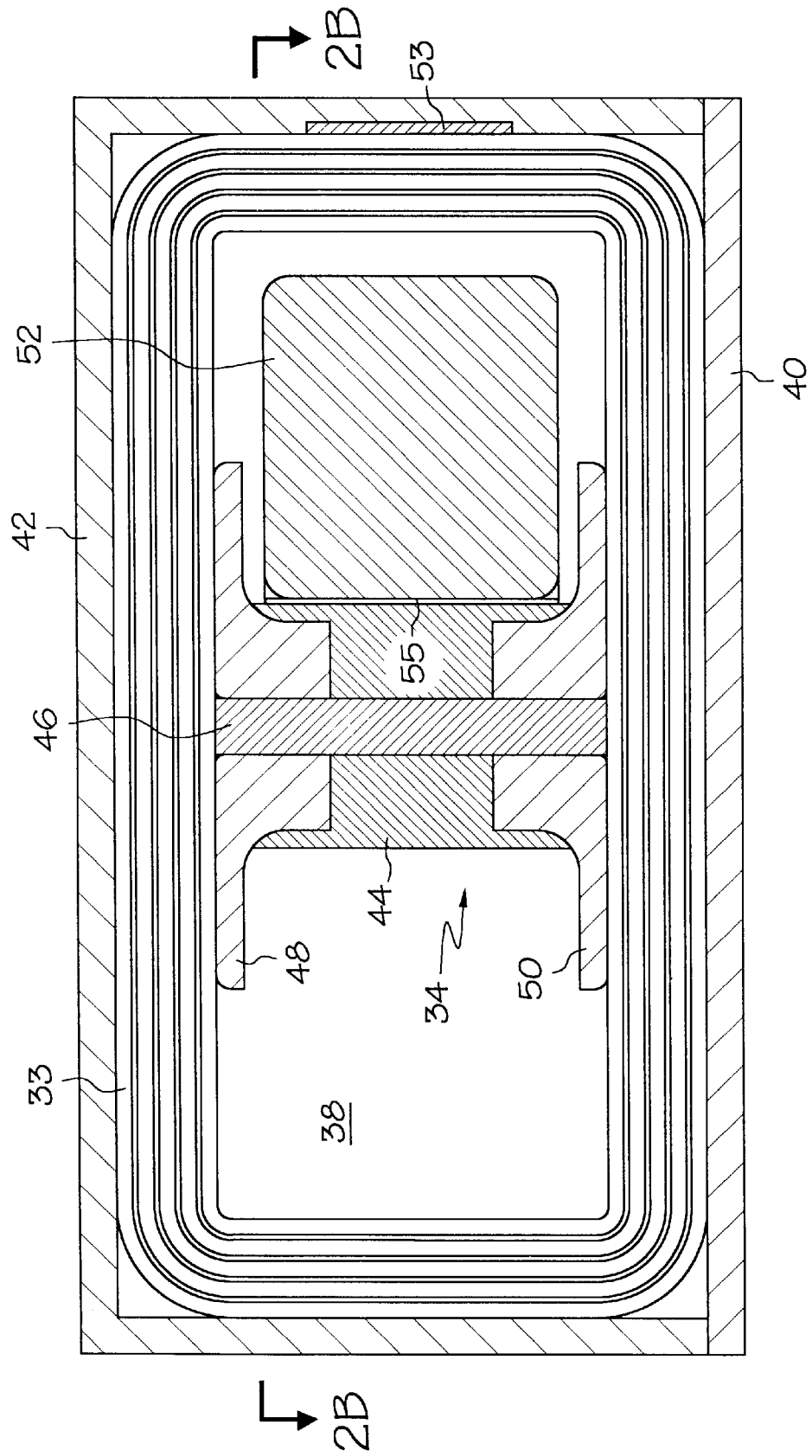
FIG. 2A is an elevational, cross-sectional view of the vibrating transducer of the present invention (taken along line 2A—2A of FIG. 2B)
Figure 2B:
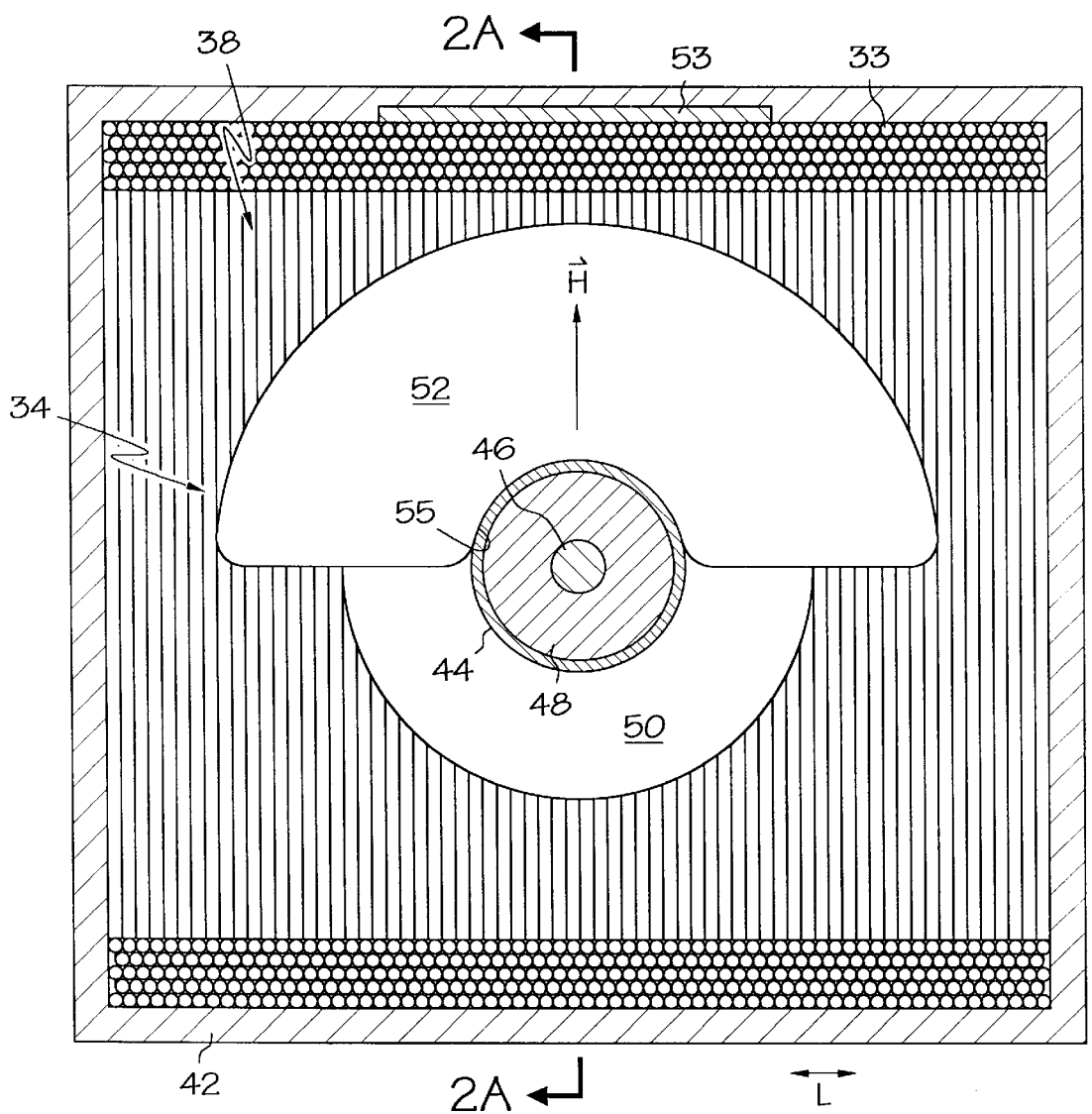
FIG. 2B is a top, cross-sectional view of the vibrating transducer taken along line 2B—2B of FIG. 2A.

As shown in FIGS. 2A and 2B, the coil 33 is wound in a longitudinal direction L to enclose a chamber 38 extending in the longitudinal direction L. Preferably, the coil 33 is layer-wound in the longitudinal direction L. The coil 33 is mounted to a substrate 40 and is also encased by a low-cost, molded plastic housing 42, which is also mounted to the substrate 40. The rotor assembly 34 includes a center hub 44, including a shaft 46 extending through the center of the rotor hub 44. The center shaft 46 extends between an upper end bearing 48 and a lower end bearing 50, which are in turn mounted, preferably by epoxy, to the coil 33 within the chamber 38. Rotor assembly 34 also includes an eccentric shaped magnet 52 mounted, preferably by epoxy, to the center hub 44. As shown in FIGS. 2A and 2B, the magnet 52 is preferably semi-cylindrical, i.e., shaped as a half-donut, where its inner circumferential surface (hole) 55 is mounted to the center hub. As will be described in detail below, when a suitable magnetic field is produced by the coil 33, the rotor assembly 34 will rotate within the upper and lower end bearings 48, 50. The eccentric shape of the magnet 52 provides an eccentric weight, such that rotation of the rotor assembly 34 within the coil causes the motor 30 to vibrate.

Preferably, the magnet 52 is a neodium/iron/boron-magnet stabilized with electroless nickel plate. The magnet 52 is magnetized in a direction parallel to its axis of symmetry (in the H direction). The end bearings 48, 50 are preferably grade 4203 poly (amide-imide), the shaft 46 is preferably a high-speed steel polished drill rod, the center hub 44 is preferably free machining brass, and the substrate 40 is preferably FR404 epoxy glass.

Accordingly, the motor design is extremely simple, consisting of a rectangular coil 33 with a rotating, off-center magnet 52 therewithin. Since no external shaft is necessary, rotor assembly 34 can be completely contained within the confines of the coil 33. Operating force is transmitted to the outside housing 42 through the shaft 46 and bearing structures 48, 50.

Figure 3A:
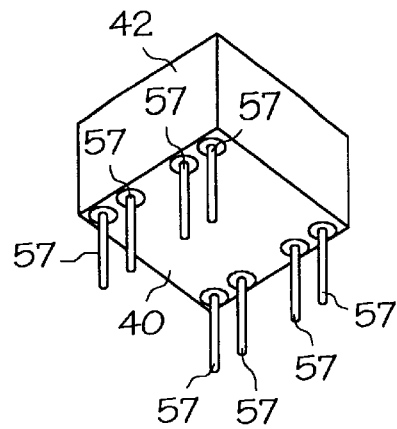
FIG. 3A is a bottom, perspective view of the vibrating transducer of the present invention including pins, facilitating PC mounting.
Figure 3B:
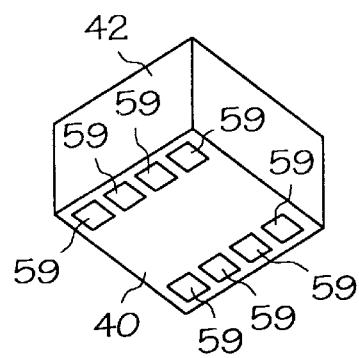
FIG. 3B is a bottom, perspective view of the vibrating transducer of the present invention including surface-mount pads, facilitating surface mounting.
Figure 3C:
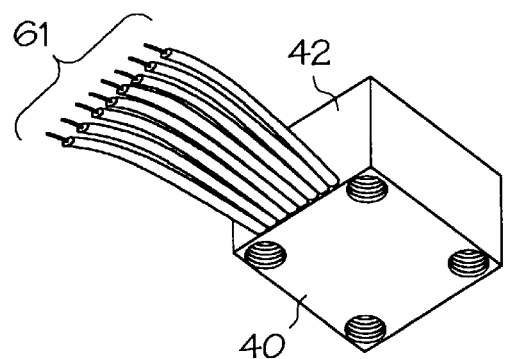
FIG. 3C is a bottom, perspective view of the vibrating transducer of the present invention including break-out wires, facilitating optional mounting methods.

The substrate 40 is preferably a glass-epoxy printed-circuit-board material, which facilitates the mounting of associated driver circuitry thereon and also facilitates the inclusion of PC-mount pins 57 (see FIG. 3A), surface-mount pads 59 (see FIG. 3B), or wire leads 61 (see FIG. 3C) thereto. Driver circuitry for use with the present invention is described in detail below.

The motor torque varies approximately as the sine of the angle between the longitudinal axis of the coil (which defines the direction of flux inside the coil) and the axis of symmetry of the magnet (the direction of magnetization H); thus, if the magnet is at rest and these axes are aligned, the torque is zero (0), and the motor cannot start. Torque is maximum when the magnet's axis of symmetry and the longitudinal axis of the coil are at 90°. As shown in FIGS. 2A and 2B, a small, 0.001 inch thick strip 53 of nickel-iron alloy is therefore attached to the casing on one side of the coil 33 to position the magnet 52 so that, when power is off, the magnet's axis of symmetry and the longitudinal axis of the coil are at 90°, thereby facilitating maximum torque at startup. The strip 53 is preferably placed near or on a side of the coil which is in a plane parallel to the magnet axis of rotation, in such a manner as to minimize bearing loading/friction.

As will be further described below, the power to the coil 33 is switched (reversed) when the magnet 52 reaches the extremity of travel (the extremity of travel will be the end of the coil when running, but during start-up, may or may not be the end of the coil), and a preferred method of determining when to switch the power is by detecting motion-generated or "back EMF" in the coil 33 using the comparator circuit 36.

Figure 4:
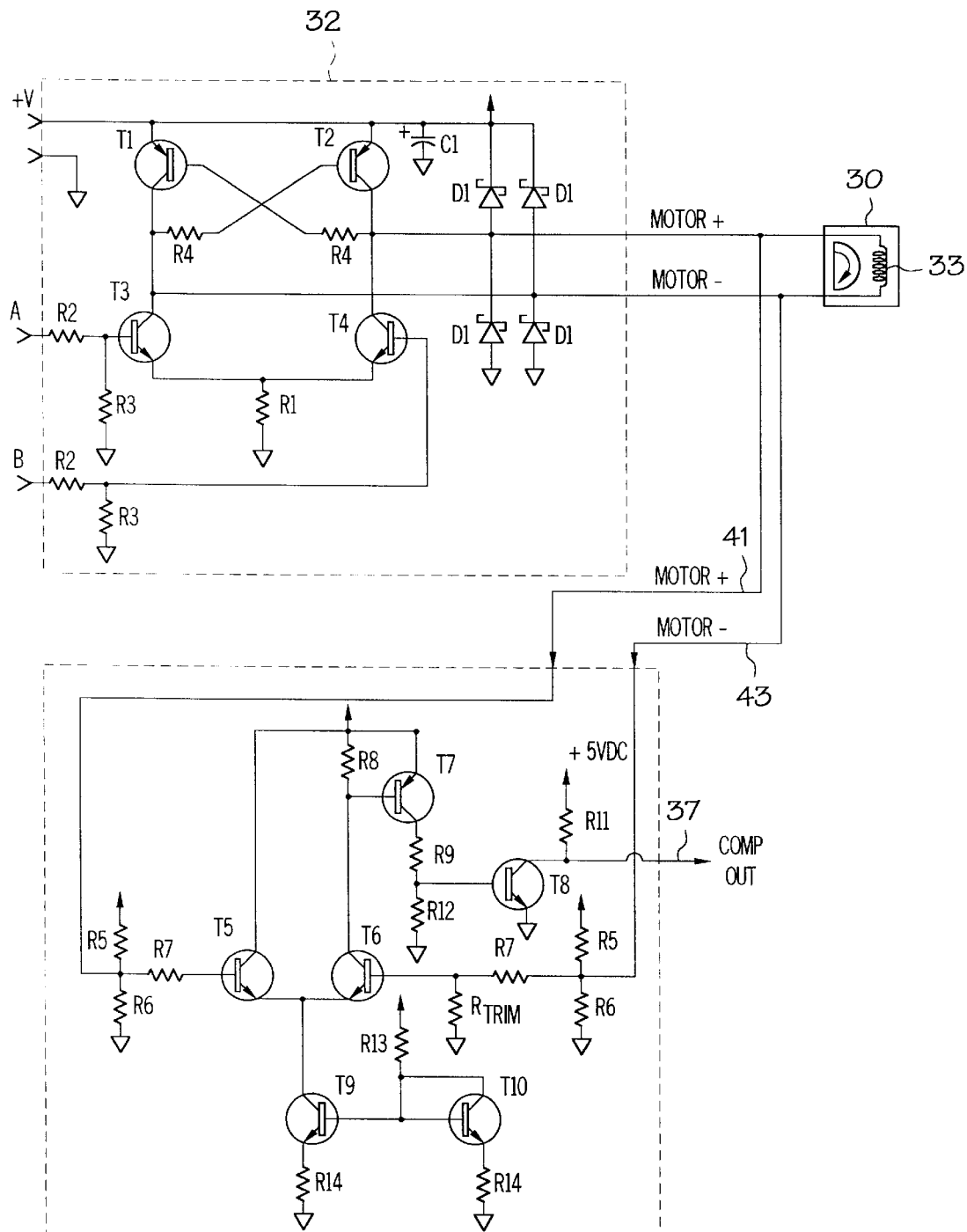
FIG. 4 is a schematic representation of H-bridge and comparator circuits for use with the present invention.

As shown in FIG. 4, in one embodiment, the switching power source 32 utilizes a conventional H-bridge circuit. Directional inputs A and B are provided by the central processor 20. As those of ordinary skill in the art will recognize, when input A is active, NPN transistor T3 is activated, causing PNP transistor T2 to activate, which in turn allows positive current to flow through T2, through the coil 33, through NPN transistor T3, to ground. Accordingly, activating input A, provides positive Voltage across the motor 30. Likewise, when input B is activated by the central processor, NPN transistor T4 is activated, causing PNP transistor T1 to be pulled to active. Therefore, positive current flows through PNP transistor T1, then through the coil 33, through NPN transistor T4, and then to ground. Accordingly, activating input B causes negative Voltage to be applied across the motor 30. Resistor R1 is coupled to the emitters of NPN transistors T3 and T4 and is used to lower the transitional/shoot through current spikes in the circuit. The individual values of the components of the H-bridge circuit of the first embodiment are given in the table below:

| Ref. | Type | Value/Type |
|---|---|---|
| T1 | PNP Transistor | MPS751 |
| T2 | PNP Transistor | MPS751 |
| T3 | NPN Transistor | MPS651 |
| T4 | NPN Transistor | MPS651 |
| R1 | Resistor | 1 Ohm |
| R2 | Resistor | 300 Ohm |
| R3 | Resistor | 200 Ohm |
| R4 | Resistor | 100 Ohm |
| C1 | Capacitor | 47 micro-Farads |
| D1 | Schottky Diode | SD103A |

Comparator circuit 36 is a conventional comparator circuit which will activate the output ("COMP OUT") 37 when the Voltage on motor lead ("MOTOR +") 41 is greater than the Voltage on motor lead ("MOTOR −") 43, and will likewise deactivate the COMP OUT 37 when MOTOR−43 has a higher Voltage than MOTOR+ 41. When the Voltage on MOTOR+ is greater than the Voltage on MOTOR−, NPN transistor T5 will activate and NPN transistor T6 will deactivate, causing PNP transistor 17 to deactivate. Lack of Voltage out of divider circuit R9, R12 deactivates NPN transistor T8, which allows R11 to pull COMP OUT Voltage high. When the MOTOR−Voltage is greater than the MOTOR+Voltage, T6 will be active and NPN transistor T5 will deactivate. When T6 is active, PNP transistor T7 is in turn activated, allowing the divider circuit R9, R12 to activate NPN transistor T8, which pulls COMP OUT low. NPN transistors T9 and T10 and resistors R13 and R14 comprise a 100 micro-amp current source. The values of the first embodiment of the comparator circuit 36 are given in the table below ($R_{TRIM}$ trims the comparator input offset Voltage to 0, and is typically 115 K-Ohms):

| Ref. | Type | Value/Type |
|---|---|---|
| T5 | NPN Transistor | 2N5089 |
| T6 | NPN Transistor | 2N5089 |
| T7 | PNP Transistor | 2N3906 |
| T8 | NPN Transistor | 2N3904 |
| T9 | NPN Transistor | 2N5089 |
| T10 | NPN Transistor | 2N5089 |
| R5 | Resistor | 1K-Ohm |
| R6 | Resistor | 3.0K-Ohm |
| R7 | Resistor | 10K-Ohm |
| R8 | Resistor | 100K-Ohm |
| R9 | Resistor | 1K-Ohm |
| R11 | Resistor | 10K-Ohm |
| R12 | Resistor | 10K-Ohm |
| R13 | Resistor | 5.1K-Ohm |
| R14 | Resistor | 2K-Ohm |
| $R_{TRIM}$ | Resistor | See above |

Figure 5:
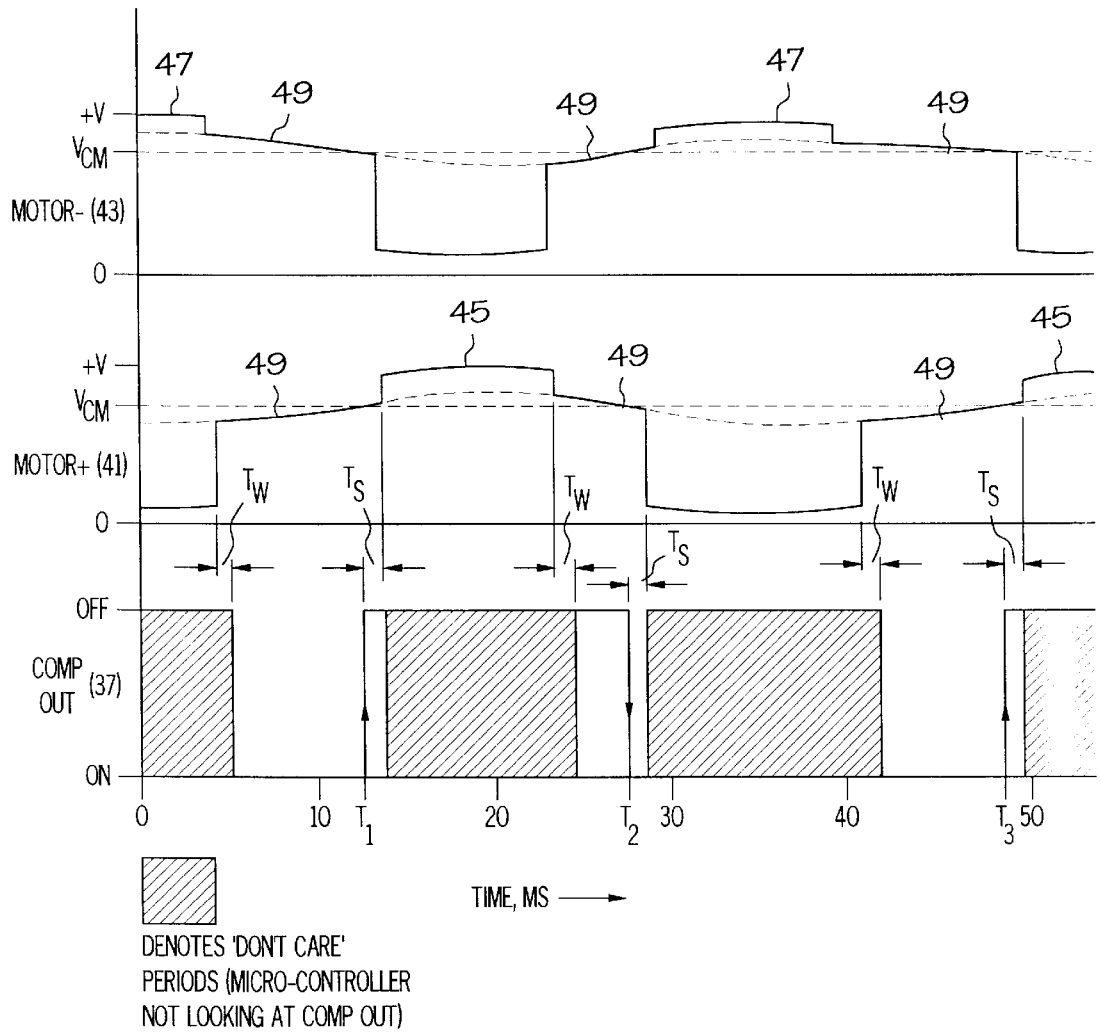
FIG. 5 is a time versus Voltage diagram illustrating operation of the H-bridge and comparator circuits of FIG. 4.

Operation of the H-bridge circuit 32 and the comparator circuit 36 is illustrated by reference to the Voltage versus timing diagram as shown in FIG. 5. The Voltage versus timing diagram of FIG. 5 depicts three signals, COMP OUT, MOTOR+ and MOTOR− in comparison to each other with respect to time. Activation of the A input into H-bridge circuit 32 by the central processor 20 can be seen by the substantially square peaks 45 in the MOTOR+ Voltage signal. Activation of the B input into the H-bridge circuit 32 by the central processor 20 can be seen as square peaks 47 in the MOTOR−Voltage signal. The sinusoidal portions 49 of each of the MOTOR+ and the MOTOR−Voltage signals, represent the back EMF in the coil 33 caused by the moving (rotating) magnet 52 when neither of the A or B inputs into H-bridge circuit are activated. $T_w$ denotes the software delay time to allow for L/R decay (see functional block 60 of FIG. 6). Significant transitions of the comparator circuit 36 output, COMP OUT, are indicated by arrows at times T1, T2, and T3 (13 msec, 28 msec and 49 msec). The edges of the "don't care" areas are not significant. $T_s$ is the total time from a COMP OUT edge to output transistor activation, and includes software latency (time for the microcontroller to execute the software and respond) and time for the electronics (transistors, etc.) to switch on.

Because the magnet 52 will be rotating within the coil 33; during one 180° segment of its rotation, the magnet will have a velocity component in a first longitudinal direction with respect to the coil, and during the other 180° segment of its rotation, the magnet will have a velocity component in an opposite longitudinal direction with respect to the coil. As will be known to one of ordinary skill in the art, the back EMF signal in the coil 33 is directly dependent upon the product of magnet flux density and the magnet's velocity component due to the magnet's rotation within the coil 33. The central processor 20 is thus able to determine which longitudinal direction the magnet is traveling, with respect to the coil, by sampling the COMP OUT signal 37 from the comparator circuit.

Figure 6:
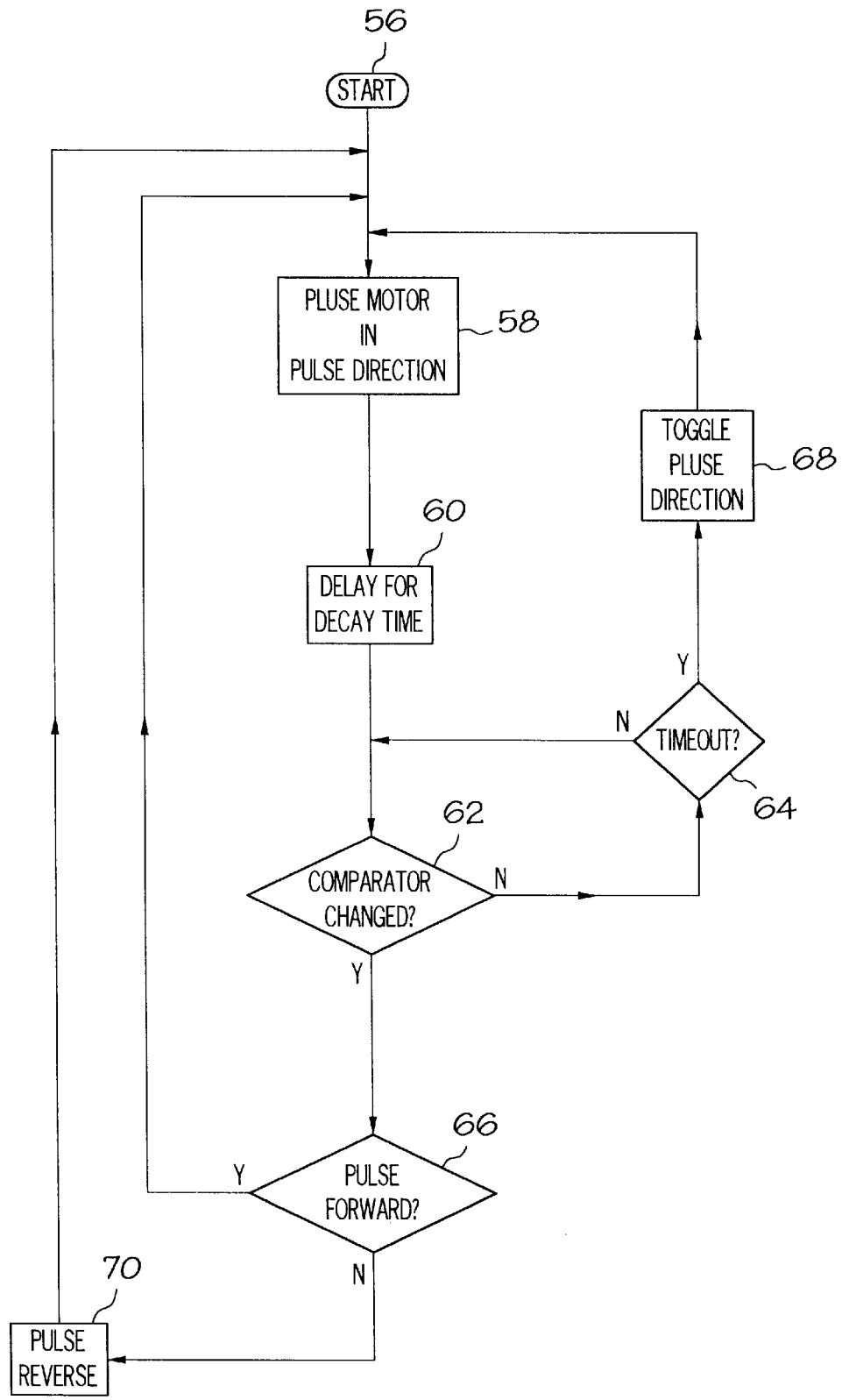
FIG. 6 is a flow diagram illustrating operation of the microcontroller or microprocessor of the present invention.

As discussed above, the central processor 20 uses the COMP OUT signal 37 to determine which of the appropriate driver input signals, A or B, to apply to the H-bridge circuit 32. FIG. 6 depicts a control algorithm for use by the central processor 20. At functional block 56, the motor is not operating, and to start the motor, the central processor 20, in functional block 58, will direct the H-bridge circuit to pulse the motor in a first direction, for a predetermined pulse time, either by activating the A input line or the B input line for the predetermined pulse time. In the present embodiment, the predetermined pulse time is 10 milliseconds. Advancing to functional block 60, the central processor will then delay for an appropriate L/R decay time. L/R decay time is the time required for the current in a circuit containing inductance (L) and resistance (R) to decay to an acceptable value. The L/R decay time for the present embodiment is 1 millisecond. In the loop formed by functional blocks 62 and 64, the central processor will sample the COMP OUT signal 37 from the comparator circuit 36 for a predetermined period of time or until the COMP OUT signal changes. In the present embodiment, the predetermined time to sample the COMP OUT signal in blocks 62 and 64 is 24 milliseconds. If, in functional block 62, the central processor determines that the COMP OUT signal had changed, the central processor will advance to functional block 66. But if a time-out occurred in functional block 64, before the COMP OUT signal changes, the central processor will advance to functional block 68. Typically a time-out will occur only in a situation where the first pulse delivered in functional block 58 failed to move the magnet; and therefore, the motor will need to be pulsed in the opposite direction. Accordingly, in functional block 68 the central processor toggles the pulse direction and returns to functional block 58 to cause the H-bridge circuit to pulse the motor in the opposite direction (i.e., if the A input line was originally activated, now the B input line will be activated). From functional block 58, the central processor returns to functional block 60.

If, in functional block 62 the central processor had determined that the COMP OUT signal had changed, then in functional block 66, the central processor will determine, based upon the new value of the COMP OUT signal, which longitudinal direction (relative to the coil) that the magnet was traveling. If the COMP OUT signal indicates that the magnet was traveling in the reverse direction, the central processor will set the pulse direction to the forward direction and then return to functional block 58 to pulse the motor in the forward direction. However, if the COMP OUT signal indicates that the magnet was traveling in the forward direction, the central processor will advance to functional block 70 to set the pulse direction to the reverse direction. From functional block 70, the central processor returns to functional block 58 reverse direction. As will be apparent from the above, steps 58, 60, 62, 64 and 68 will repeat until the motor is started; and steps 58, 60, 62, 66, and 70 will repeat once the motor has started and until the central processor deactivates the motor.

Figure 7:
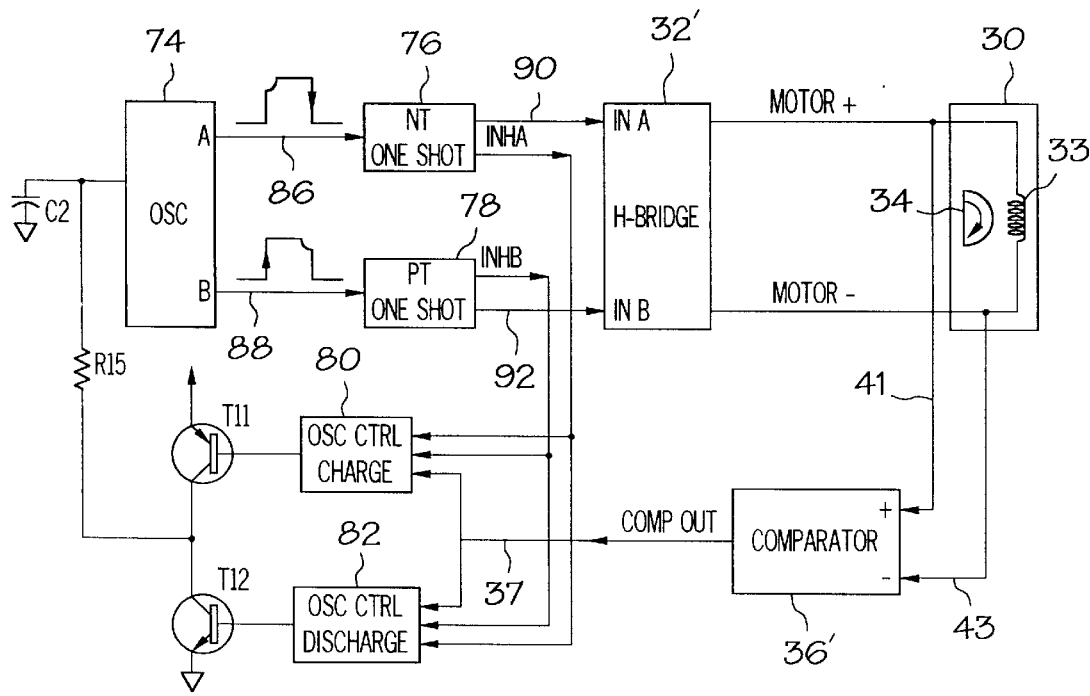
FIG. 7 is a block-diagram representation of an alternate embodiment of the vibrating transducer.

As shown in FIG. 7, another embodiment of the present invention uses a motor driver circuit having all transistors and no microcontrollers, making the circuit suitable for realization in the form of a single monolithic bipolar integrated circuit. The circuit utilizes an H-bridge driver 32' and a comparator 36' similar to the first embodiment above, however, the control algorithm as depicted in FIG. 6 is implemented in a form of an oscillator circuit 74, two monostable (one-shot) multivibrator circuits 76, 78, and oscillator control circuitry, 80, 82. The power supply is a single nickel cadmium (NiCd) cell with an output Voltage of 1.3 VDC. The primary difference between the comparator 36' of the alternate embodiment of FIG. 7 and the comparator 36 of FIG. 4, is that the comparator 36' of the bipolar IC circuit uses a 1K resistor for R11, pulled up to 1.3 VDC. Also R6 is changed from 3.3 K-Ohm to 3.0 K-Ohm.

Figure 8:
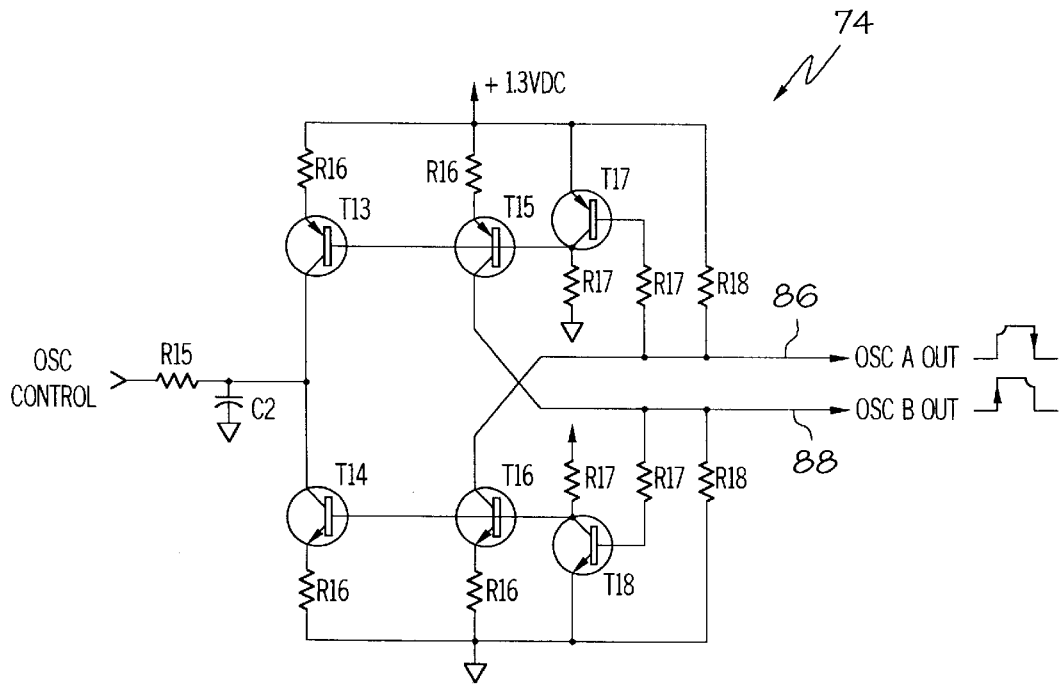
FIG. 8 is a schematic representation of an oscillator circuit for use with the embodiment of FIG. 7.

As shown in FIG. 8, the oscillator circuit 74 generates the basic pulse outputs OSC A-out 86 and OSC B-out 88. These outputs, respectively, have well defined negative transition and positive transition. Low Voltage operation is accomplished by using a current source and sink to charge and discharge a 100 nanoFarad timing capacitor C2. The individual values of the components of the oscillator circuit 74 are given in the table below:

| Ref. | Type | Value/Type |
| --- | --- | --- |
| T13 | PNP Transistor | 2N5087 |
| T14 | NPN Transistor | 2N5089 |
| T15 | PNP Transistor | 2N5087 |
| T16 | NPN Transistor | 2N5089 |
| T17 | PNP Transistor | 2N5087 |
| T18 | NPN Transistor | 2N5089 |
| R15 | Resistor | 1K-Ohm |
| R16 | Resistor | 51K-Ohm |
| R17 | Resistor | 2 M-Ohm |
| R18 | Resistor | 200K-Ohm |
| C2 | Capacitor | 100 nF |

Figure 9:
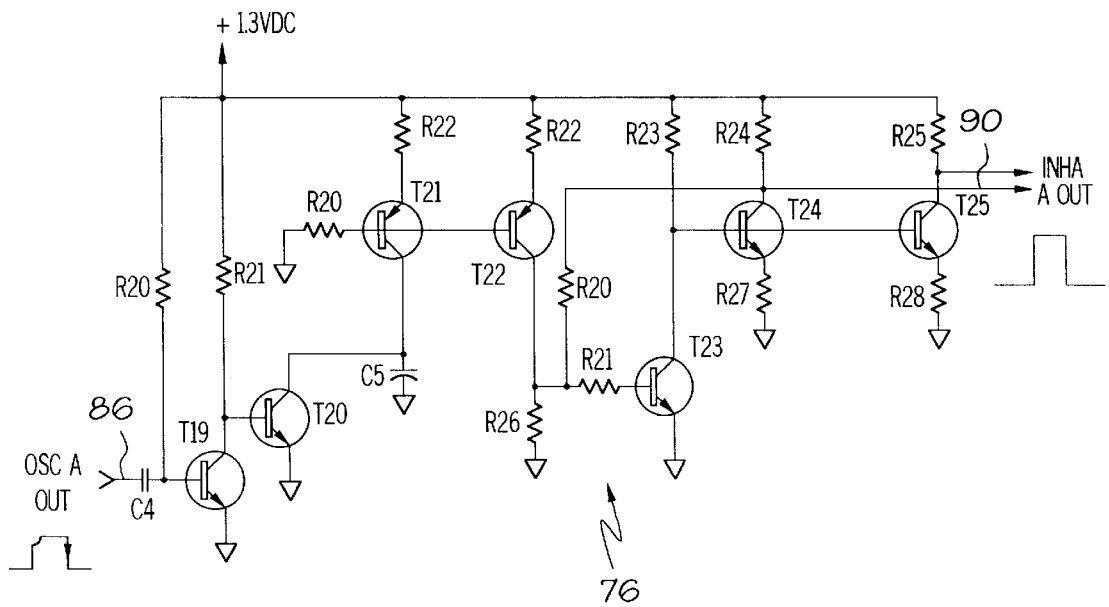
FIG. 9 is a schematic representation of an NT one-shot multivibrator circuit for use with the embodiment of FIG. 7.
Figure 10:
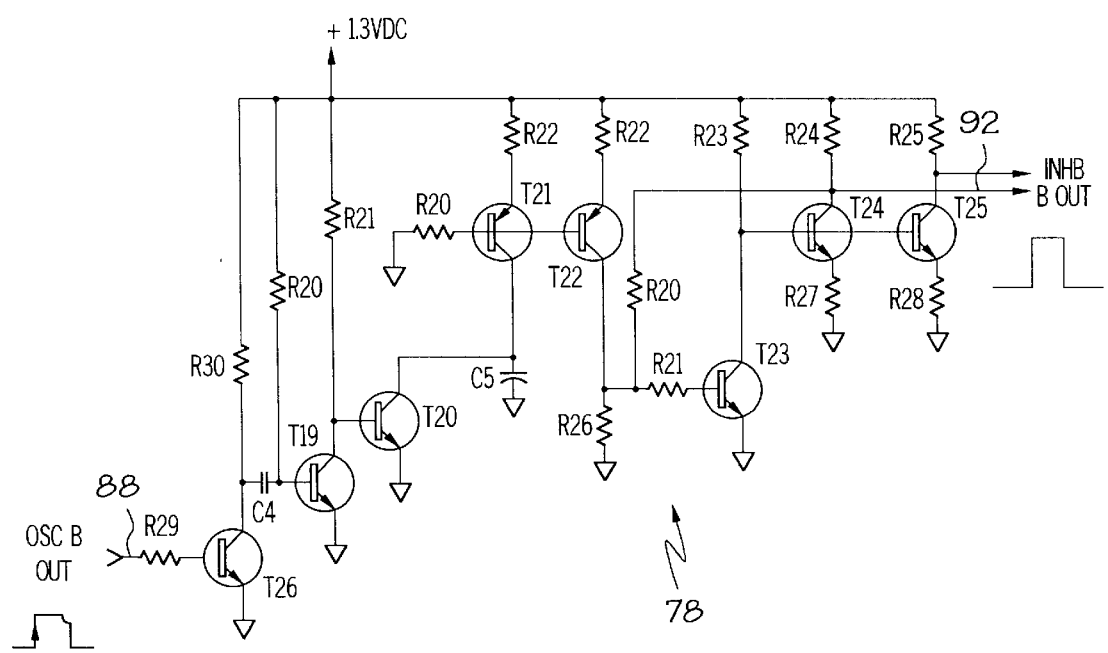
FIG. 10 is a schematic representation of a PT one-shot multivibrator circuit for use with the embodiment of FIG. 7.

As shown in FIG. 9, the NT one-shot multivibrator circuit 76 translates the positive pulse of the OSC A-out 86 into a 7 millisecond square wave pulse at A-out 90. The NT one-shot multivibrator circuit 76 utilizes a 1.0 nanoFarad capacitor C4 and a one megaOhm resistor R20 to differentiate the OSC A-out signal 86 to sense the negative edge. When the negative transition occurs, the 68 nanoFarad capacitor C5 is discharged, and the output A-out 90 goes high. The output A-out 90 remains high while the current source, realized by transistors T21, T22 and resistors R20, R22, charges capacitor C5. When capacitor C5, becomes charged, the current mirror transistor T22 turns off, and the output A-out 90 returns low. As shown in FIG. 10, operation of the PT one-shot multivibrator circuit 78 is identical to the NT one-shot multivibrator circuit 76 except an inverter T26 on the input, OSC B-out 88, makes the circuit 78 sensitive to the positive edge. The individual component values for the NT one-shot multivibrator circuit 76 and the PT one-shot multivibrator circuit 78 are given in the table below:

| Ref. | Type | Value/Type |
| --- | --- | --- |
| T19 | NPN Transistor | 2N5089 |
| T20 | NPN Transistor | 2N5089 |
| T21 | PNP Transistor | 2N5087 |
| T22 | PNP Transistor | 2N5087 |
| T23 | NPN Transistor | 2N5089 |
| T24 | NPN Transistor | 2N3904 |
| T25 | NPN Transistor | 2N5089 |
| T26 | NPN Transistor | 2N5089 |
| R20 | Resistor | 1 M-Ohm |
| R21 | Resistor | 200K-Ohm |
| R22 | Resistor | 20K-Ohm |
| R23 | Resistor | 3.9K-Ohm |
| R24 | Resistor | 100 Ohm |
| R25 | Resistor | 5.1K-Ohm |
| R26 | Resistor | 100K-Ohm |
| R27 | Resistor | 10 Ohm |
| R28 | Resistor | 1K-Ohm |
| R29 | Resistor | 2 M-Ohm |
| R30 | Resistor | 200K-Ohm |
| C4 | Capacitor | 1 nF |
| C5 | Capacitor | 68 nF |

Figure 11:
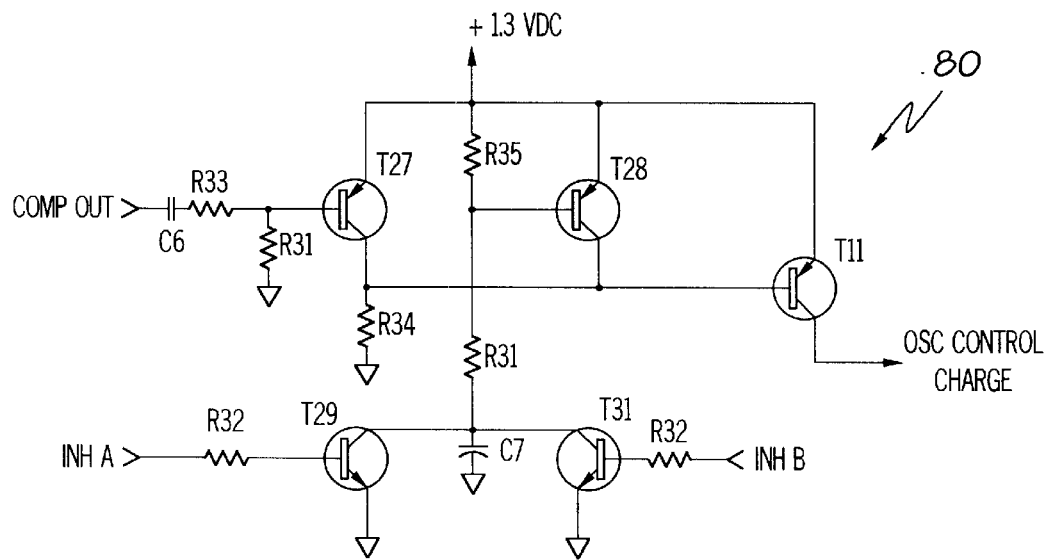
FIG. 11 is a schematic representation of an oscillator charge-control circuit for use with the embodiment of FIG. 7.
Figure 12:
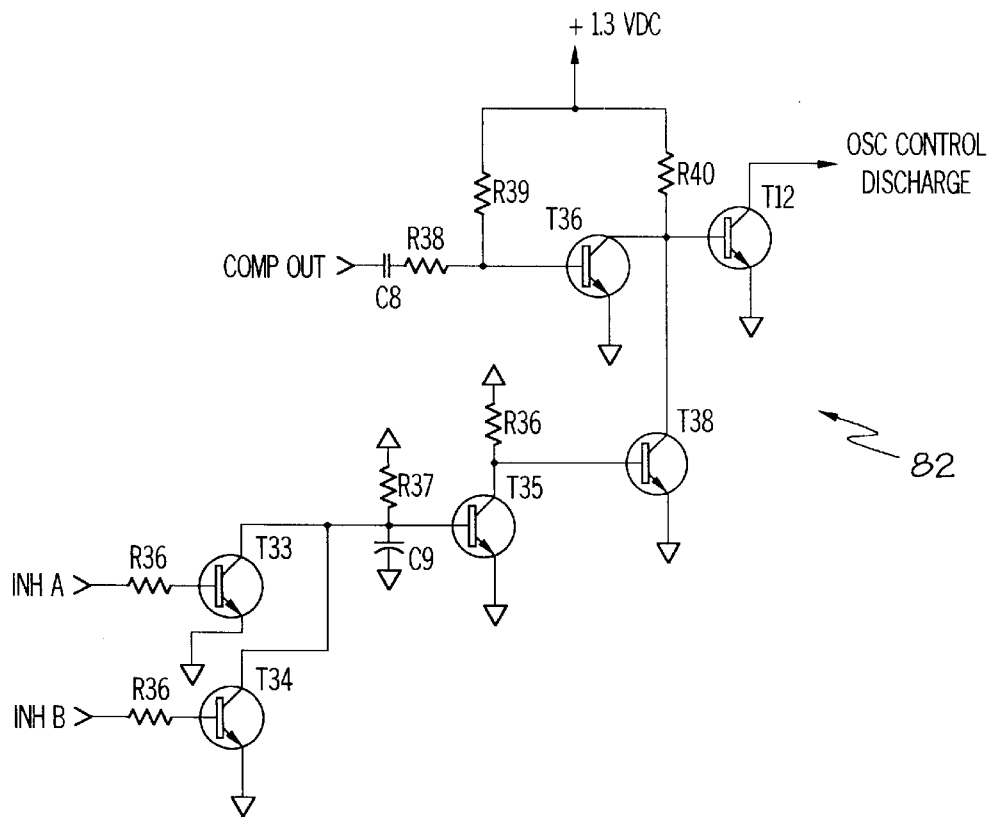
FIG. 12 is a schematic representation of an oscillator discharge-control circuit for use with the embodiment of FIG. 7.

FIGS. 11 and 12, respectively show the oscillator charge control and discharge control circuits 80, 82. The oscillator control circuits respectively charge or discharge the 100 nF oscillator capacitor C2 when the comparator circuit 36' senses the direction change in back-EMF of the motor. Since back-EMF is sensed only when the H-bridge circuit outputs are off, response is inhibited during drive pulses by INH A and INH B (see FIGS. 9 and 10). Also the 2.2 nF delay timing capacitors C7, C9 increase inhibit time, to allow the motor winding current to decay to a negligible value. The individual values of the oscillator charge control circuit 80 are as follows:

| Ref. | Type | Value/Type |
| --- | --- | --- |
| T27 | PNP Transistor | 2N5087 |
| T28 | PNP Transistor | 2N5087 |
| T29 | NPN Transistor | 2N5089 |
| T31 | NPN Transistor | 2N5089 |
| T11 (see FIG. 7) | PNP Transistor | 2N5087 |
| R31 | Resistor | 1 M-Ohm |
| R32 | Resistor | 100K-Ohm |
| R33 | Resistor | 30K-Ohm |
| R34 | Resistor | 200K-Ohm |
| R35 | Resistor | 5.1 M-Ohm |
| C6 | Capacitor | 1 nF |
| C7 | Capacitor | 2.2 nF |

The individual values of the oscillator discharge control circuit 82 are as follows:

| Ref. | Type | Value/Type |
| --- | --- | --- |
| T33 | NPN Transistor | 2N5089 |
| T34 | NPN Transistor | 2N5089 |
| T35 | NPN Transistor | 2N5089 |
| T36 | NPN Transistor | 2N5089 |
| T12 (see FIG. 7) | NPN Transistor | 2N5089 |
| T38 | NPN Transistor | 2N5089 |
| R36 | Resistor | 100K-Ohm |
| R37 | Resistor | 2 M-Ohm |
| R38 | Resistor | 30K-Ohm |
| R39 | Resistor | 1 M-Ohm |
| R40 | Resistor | 200K-Ohm |
| C8 | Capacitor | 1 nF |
| C9 | Capacitor | 2.2 nF |

Figure 13:
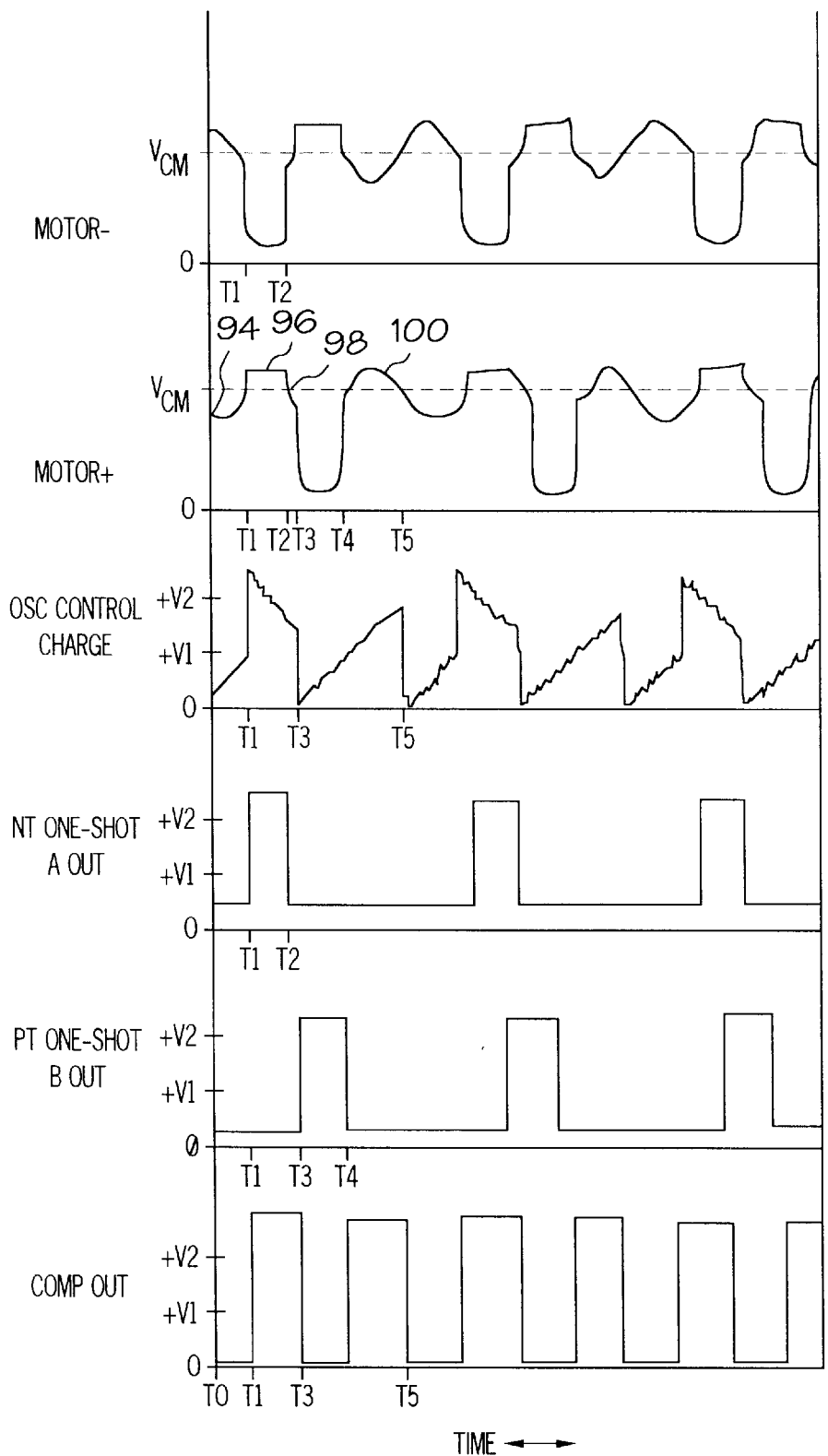
FIG. 13 is a time versus Voltage diagram illustrating operation of the motor control circuitry of FIGS. 7–12.

Operation of the motor driver circuitry shown in FIGS. 7–12 is described in reference to the operational waveforms shown in FIG. 13. When the H-bridge 32' is off, the 1K, 3.3K input dividers establish the zero-input Voltage to the comparator 36' at the common-mode Voltage $V_{CM}$. Thus, the back-EMF generated Voltage (at MOTOR+ or MOTOR−) is measured as positive or negative with respect to $V_{CM}$, which is 1.00 VDC for a 1.30 VDC supply. The differential-input comparator 36' (by definition) responds to the difference in Voltage between MOTOR+ and MOTOR−.

Referring to the MOTOR+ waveform and progressing left to right, a negative-going lobe 94 of motor back-EMF is observed. This is the small, nearly sinusoidal waveform with a peak-to-peak magnitude of approximately 600 mV, and appears when the forward (A-Out) and reverse (B-Out) pulses are off. At this time, T0, the OSC CONTROL CHARGE waveform shows the oscillator timing capacitor C2 Voltage ramping as it is charging from the constant-current source. At time T1 (7 msec) the back-EMF becomes 0, the COMP OUT waveform switches high and the oscillator capacitor C2 charges rapidly turning on the forward H-bridge legs, as evidenced by the peak 96 on the MOTOR+ waveform. The forward pulse lasts for the NT one-shot time of about 7 msec, and turns of at time T2. The back-EMF pulse may again be observed on the MOTOR+ waveform as lobe 98. At time T3, the back-EMF goes through zero, causing the COMP OUT waveform to switch back to zero, which causes the oscillator control circuits to discharge the oscillator timing capacitor, and to turn the reverse pulse, B-Out, on. The reverse pulse lasts until time T4, where the back-EMF 100 is again apparent on the MOTOR+ waveform, first positive going, and then passing through 0 at time T5. Therefore, at time T5, the oscillator timing capacitor discharges rapidly. However, since the output (of the oscillator) is already in the negative state, a second reverse pulse is not generated (no positive transition is generated and the PT one-shot circuit does not put out a pulse). The actual motor speed is, however, determined by pulse. For the purposes of this disclosure, the wave-forms of FIG. 13 are shown in the proper time sequence for only the first cycle.

Figure 14:
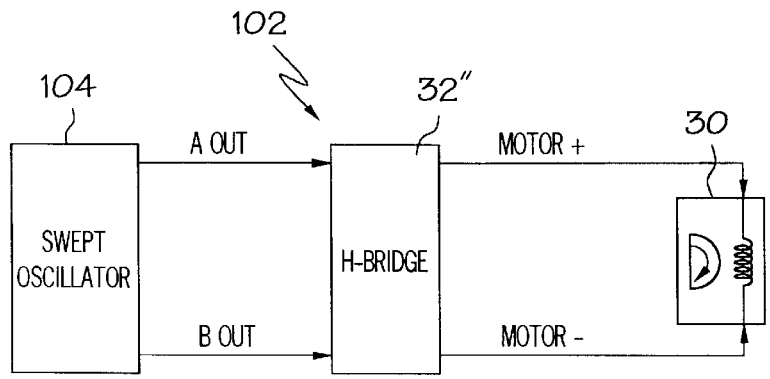
FIG. 14 is a block-diagram representation of a motor control unit in yet another embodiment of the present invention.

As shown in FIG. 14, another alternate embodiment of the present invention 102 uses a swept-frequency motor driver circuit. The circuit utilizes a oscillator controller 104 to provide a switched input to the H-bridge circuit 32" at a frequency which is continuously swept from low to high. The low end of the frequency is low enough to start the motor when it is at rest. The frequency is thereafter swept up to increase the velocity of the motor. The unit is then turned off, allowing the rotor to coast. Then, the frequency is swept upward again, and the cycle repeats until power is removed. The use of this type of circuit eliminates the need for sensing the motor velocity (i.e., by using a comparator circuit or Hall Effect sensors). Turning off the unit between sweeps conserves energy and lowers battery drain.

Figure 15:
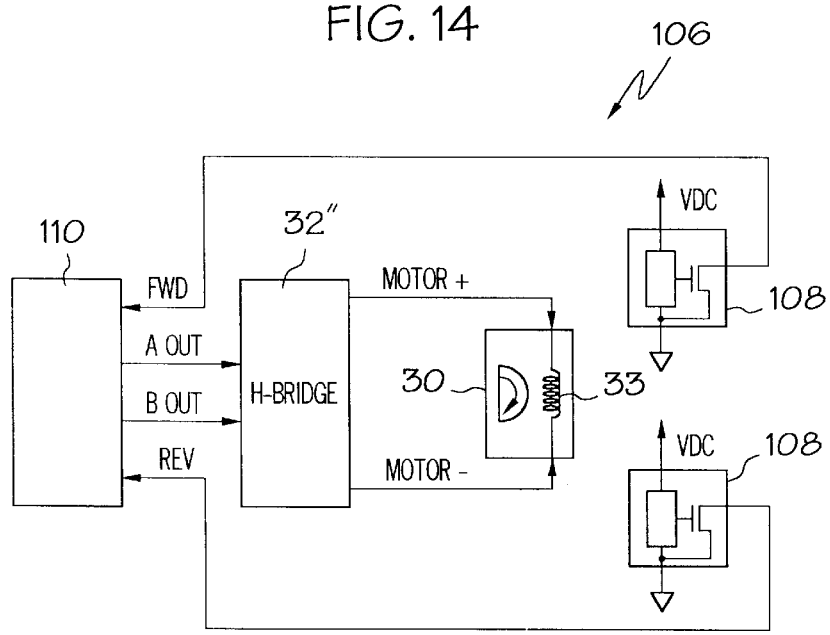
FIG. 15 is a block-diagram representation of a motor control unit in yet another embodiment of the present invention.

As shown in FIG. 15, another alternate embodiment of the present invention 106 utilizes Hall Effect switches 108 to sense the position of the rotor assembly 34, and a motor controller 110 to generate inputs to the H-bridge circuit 32" according, in part, to signals received back from the Hall Effect switches 108. A control algorithm is implemented by the controller that first starts rotation of the rotor assembly and then switches pulses to the drive coil 33 (commutates) in the proper sequence. The location of the Hall Effect switches 108 can be determined theoretically and/or by measurement. At a proper radius, axial flux of magnet 52 can produce a distinct positive peak in flux to activate the Hall-Effect switch 108. In practice, the best location was determined by moving a functioning Hall switch until proper operation was obtained.

An example Hall Effect switch is an HAL 506UA, commercially available from ITT Semiconductors. The controller 110 preferably implements the following algorithm:

1. Apply forward Voltage to the coil 33.
2. Poll the Hall inputs for switch closure.
3. If no switch closure in 35 msec, turn off for a short time to eliminate crossover currents, and then apply a pulse in an opposite direction. Go to step 2, above.
4. If a Hall switch closes, turn off the pulse and wait for the switch to open. Then apply a pulse of proper polarity (determined by which switch was activated). Then go to step 2, above.

Figure 16:
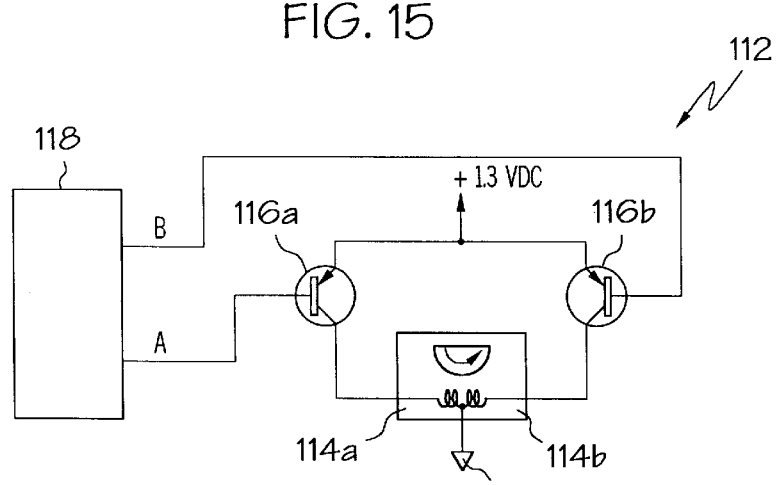
FIG. 16 is a block-diagram representation of a motor control unit in yet another embodiment of the present invention, incorporating a center-tapped coil.

As shown in FIG. 16, in another embodiment of the present invention 112, a center-tapped coil 114 can be utilized instead of the single coil of the prior embodiments. One side 114a of the coil will be coupled to a first switch 116a, while the other side 114b of the coil will be coupled to a second switch 116b. The center point of the coil 114 will be coupled to ground 120. When the switch 116a is activated by a controller 118, the first side 114a of the coil will be energized at a first polarity, and when the switch 116b is activated by the controller 118, the other side 114b of the coil will be energized at an opposite polarity. A control algorithm, such as a swept frequency algorithm, may be utilized to control the activation of the switches 116a, 116b.

Figure 18:
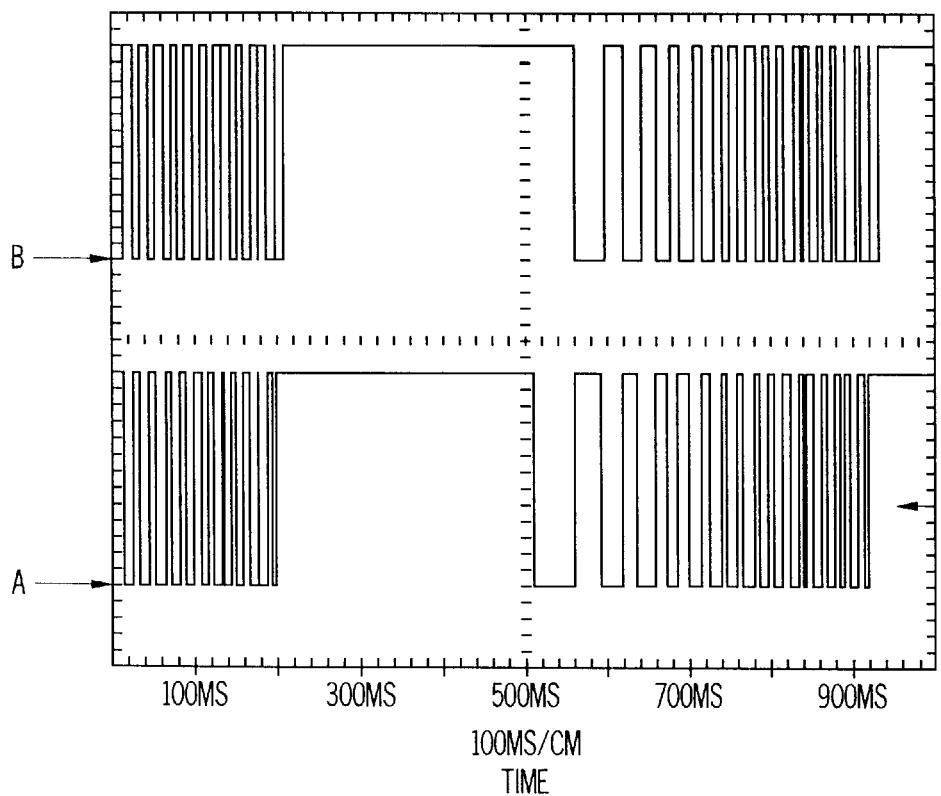
FIG. 18 is a time versus Voltage diagram illustrating operation of the motor control circuitry of FIGS. 14 and 16.

Referring to FIG. 18, the controller 104 of the circuit shown in FIG. 14 or the controller 118 of the circuit shown in FIG. 16 is programmed to switch outputs Drive A and Drive B on and off (active low) in a swept frequency. The outputs sweep from a half-period of 50 msec (10 Hz) to half-period of 6.8 msec (74 Hz). Motor pulsing time is 412 msec and off time is 308 msec, totaling 720 msec for a sweep repetition rate of 1.4 times per second.

Figure 19:
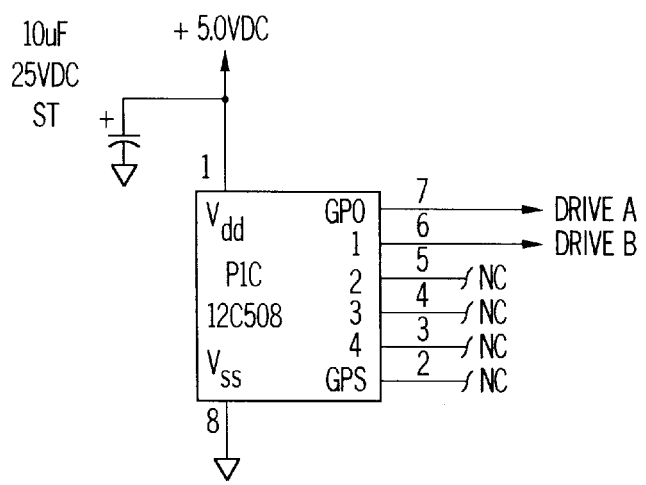
FIG. 19 is a circuit diagram for the microcontrollers of FIGS. 14 and 16.

The controllers 104, 118 are preferably a Microchip PIC12C508 microcontroller, with a circuit diagram as shown in FIG. 19. Source code for operating the controllers to provide the swept frequency output is appended hereto. The source code has a jump table which determines half-period times, approximately 200 usec per count (counts go from 1 to 256, 256 being indicated as 0). Thus, OFAH (the first value) is 250 * 0.2, or 50 msec and 22H (the last value) is 34 * 0.2, or 6.8 msec. The values between these two limits are chosen to give an exponential sweep envelope. The jump table has a total number of entries (40) defined by NUM_PULSES, and the number of half-pulses (34) is defined as ON_PULSES. A fixed off time between pulses of approximately 37 usec is implemented in the software code to eliminate transition/shoot-through currents.

Figure 17:
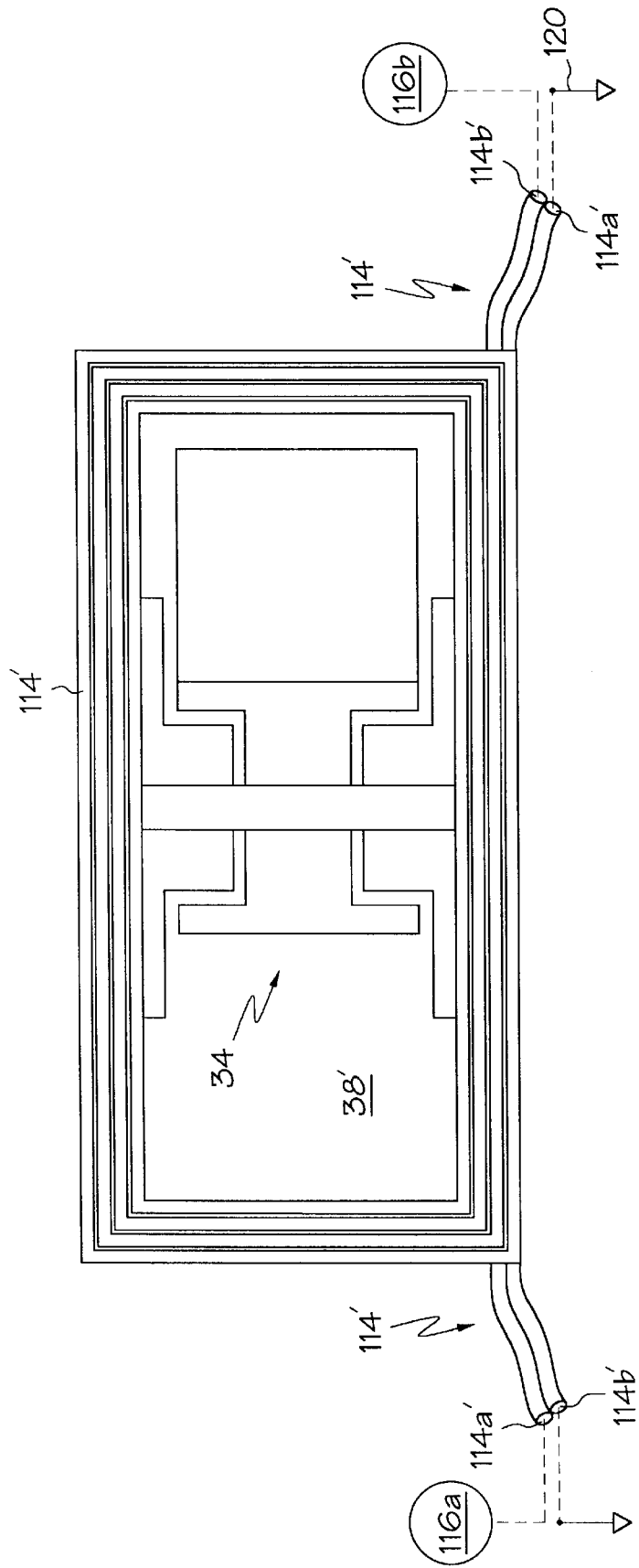
FIG. 17 is an elevational, cross-sectional view of a vibrating transducer incorporating the center-tapped coil of FIG. 16.

As shown in FIG. 17, the functionality of the center-tapped coil 114 of FIG. 16 can be met utilizing a single bifilar wound coil 114', which is two insulated wires 114a', 114b' bonded together in parallel to form a discrete bifilar wire, which is then layer-wound in a longitudinal direction to enclose a chamber 38'. Within the chamber 38', the rotor assembly 34 is mounted for rotation. At one end of the bifilar coil 114', a first wire 114a' is operatively coupled to the first switch 116a and the second wire 114b' is operatively coupled to ground 120. At the other end of the bifilar coil 114', the other end of wire 114a' is coupled to ground 120 while the other end of wire 114b' is coupled to the second switch 116b. A suitable bifilar wire for use with the present invention is commercially available from MWS Wire Industries.

Figure 20:
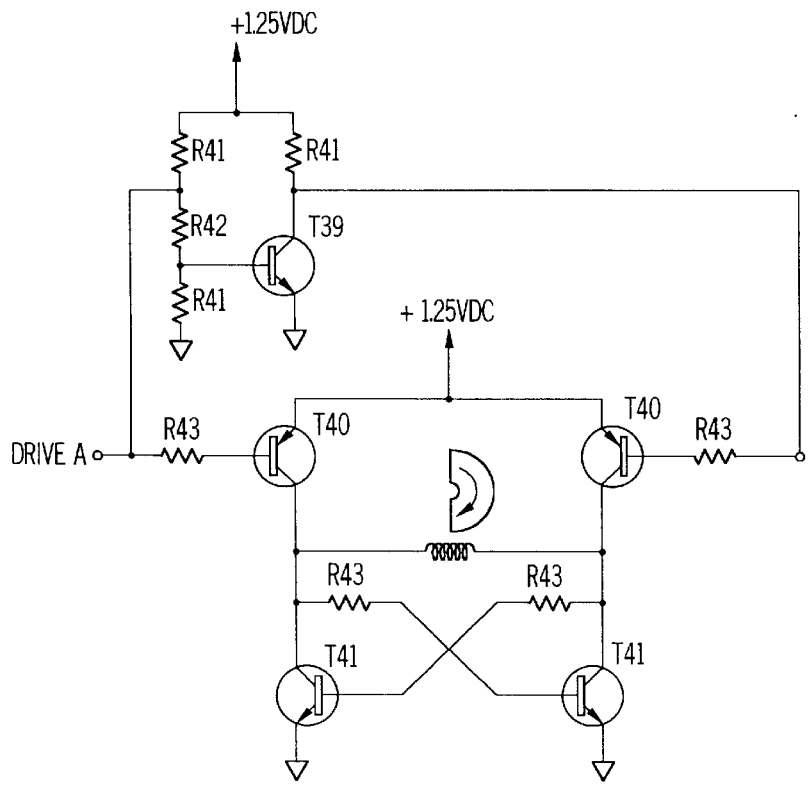
FIG. 20 is a circuit diagram for a single-input, swept-frequency H-bridge driver for use with the present invention.
Figure 21:
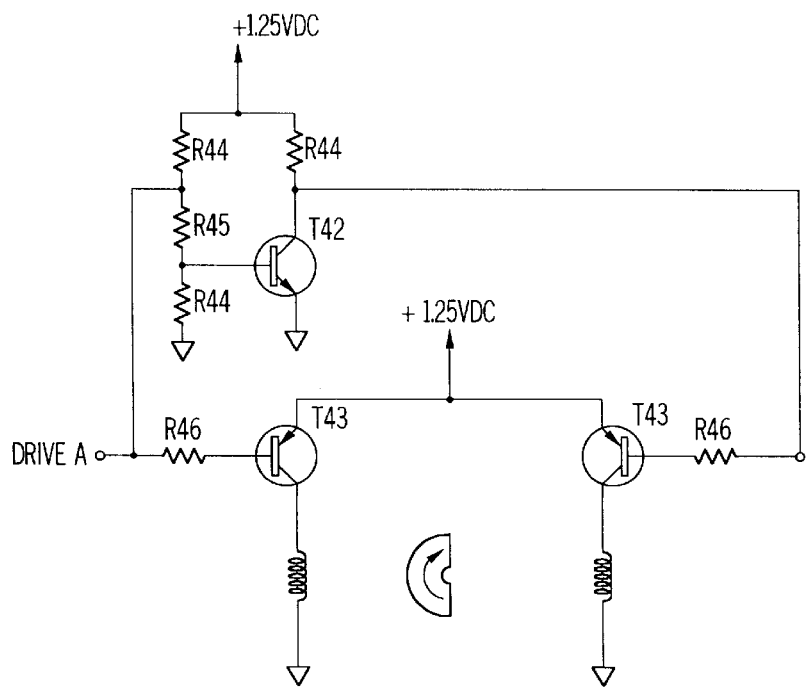
FIG. 21 is a circuit diagram for a single-input, swept-frequency dual-transistor driver for use with the present invention.

As discussed above, the embodiments of FIGS. 14 and 16 utilize dual-input swept frequency driver circuits. It is also within the scope of the invention to utilize a single-input swept frequency driver circuit as shown in FIGS. 20 and 21. FIG. 20 represents an H-bridge, single-input swept frequency driver circuit. The magnet preferably has a 5 mm radius and the coil is preferably 3 layers of #33 AWG wire, having a resistance of 4.3 Ohms. The individual values of the H-bridge, single-input swept frequency driver circuit are as follows:

| Ref. | Type | Value/Type |
| --- | --- | --- |
| T39 | NPN Transistor | BCX70 |
| T40 | PNP Transistor | BCX17 |
| T41 | NPN Transistor | BCX19 |
| R41 | Resistor | 10K-Ohms |
| R42 | Resistor | 22K-Ohms |
| R43 | Resistor | 100 Ohms |

FIG. 21 represents a dual-switch, single-input swept frequency driver circuit. The magnet preferably has a 5 mm radius and the coil is preferably 4 layers of #35 AWG bifilar wire and having a resistance of 5.8 Ohms per coil. The individual values of the dual-switch, single-input swept frequency driver circuit are as follows:

| Ref. | Type | Value/Type |
| --- | --- | --- |
| T42 | NPN Transistor | BCX70 |
| T43 | PNP Transistor | BCX17 |
| R44 | Resistor | 10K-Ohms |
| R45 | Resistor | 22K-Ohms |
| R46 | Resistor | 100 Ohms |

Figure 22:
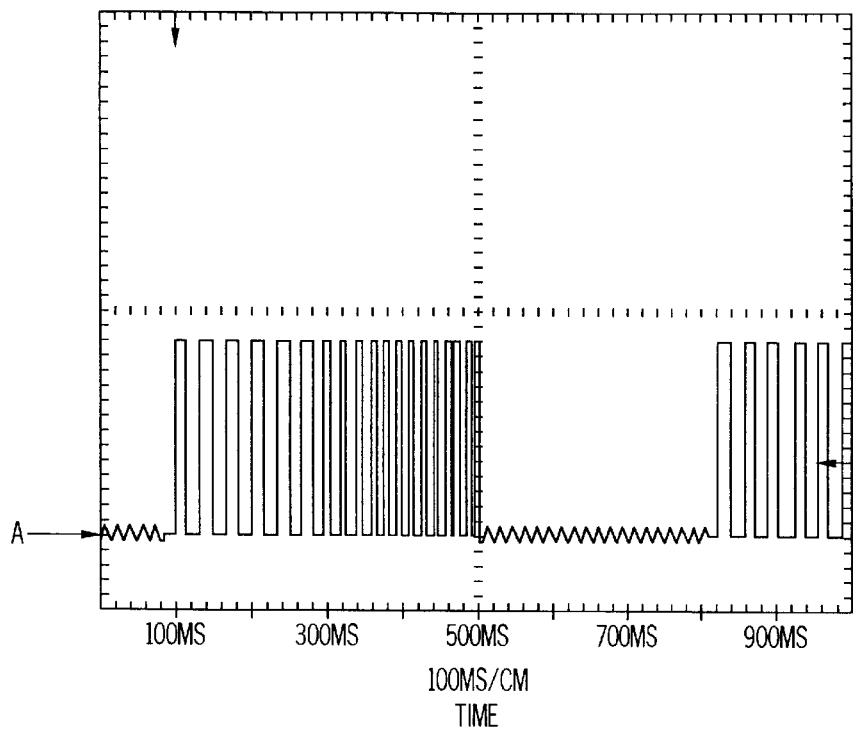
FIG. 22 is a time versus Voltage diagram illustrating operation of swept-frequency driver circuitry for use with the circuits of FIGS. 20 and 21.
Figure 23:
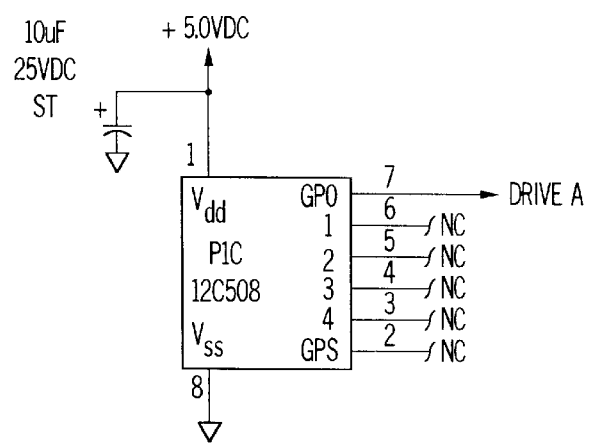
FIG. 23 is a circuit diagram for a microcontroller for generating the driver signal of FIG. 22.

Referring to FIG. 22, the controller of the circuits shown in FIGS. 20 and 21 is programmed to switch output Drive A (active low) in a swept frequency. The output starts with 10 half-cycles at 16.6 msec (30 Hz), then sweeps to a half-period of 6.8 msec (74 Hz). Motor pulsing time is 418 msec and off time is 310 msec, totaling 728 msec for a sweep repetition rate of 1.4 times per second. As shown in FIG. 23, the controller is virtually identical to that of FIG. 19, except that the GP1 output line is not used. The design of software for producing the swept frequency signal shown in FIG. 22 will be apparent to one of ordinary skill in the art.

Figure 24A:
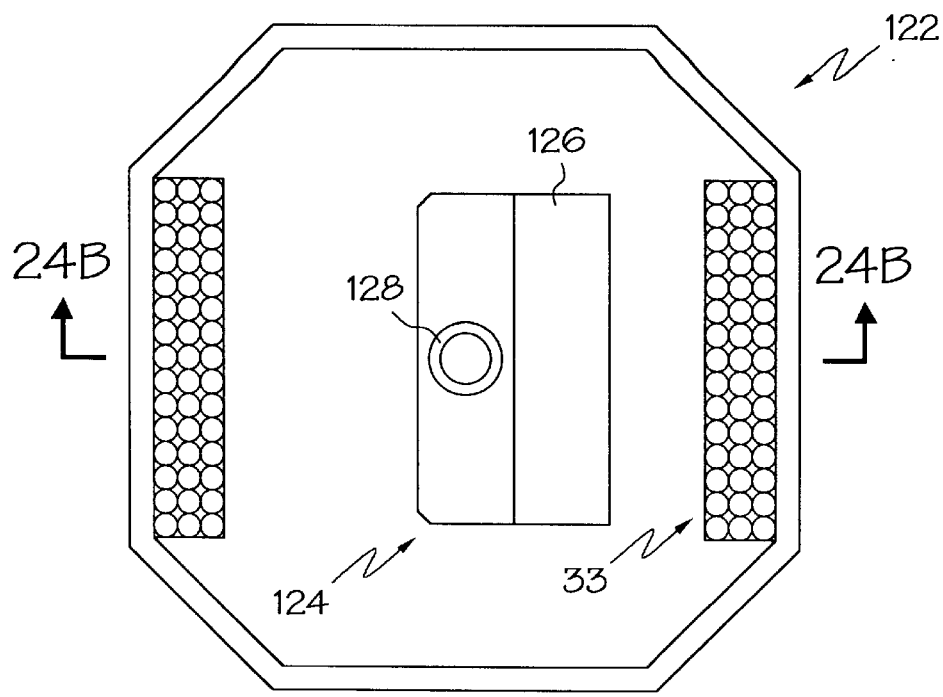
FIG. 24A is a cross-sectional top plan view of yet another embodiment of the vibrating transducer, taken along lines 24A—24A of FIG. 24B.
Figure 24B:
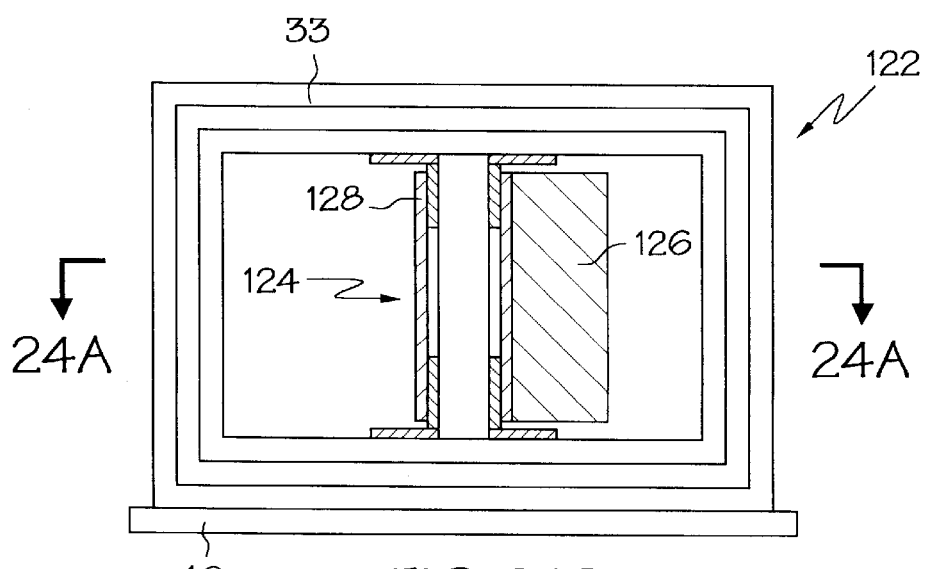
FIG. 24B is a cross-sectional elevational view of the embodiment of FIG. 24A, taken along lines 24B–24B of FIG. 24A.

FIGS. 24A, 24B and 25A, 25B illustrate that there are many ways to fashion a rotor assembly of the present invention that includes a permanent magnet and a center of mass positioned distal from the rotational axis. As shown in FIGS. 24A and 24B, in another alternate embodiment of the present invention 122, the alternate rotor assembly 124 utilizes a rectangular magnet 126 mounted with epoxy to a shaft 128. The coil 33 is mounted to a substrate 40 of glass-epoxy printed-circuit-board material. The magnet 126 provides the eccentricity of the motor by having its center of mass positioned radially distal from the shaft 128.

Figure 25A:
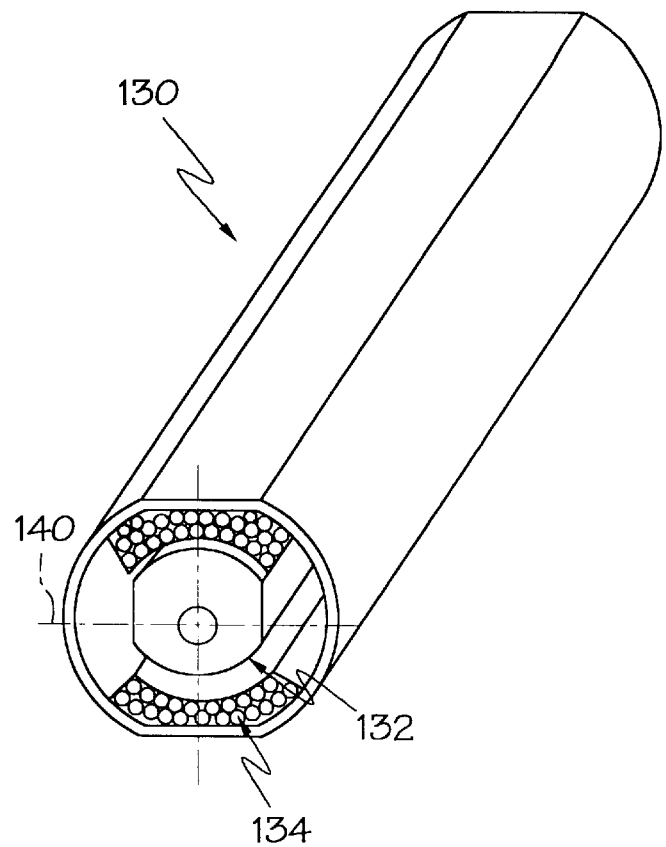
FIG. 25A is a perspective, cut-away view of yet another embodiment of the vibrating transducer.
Figure 25B:
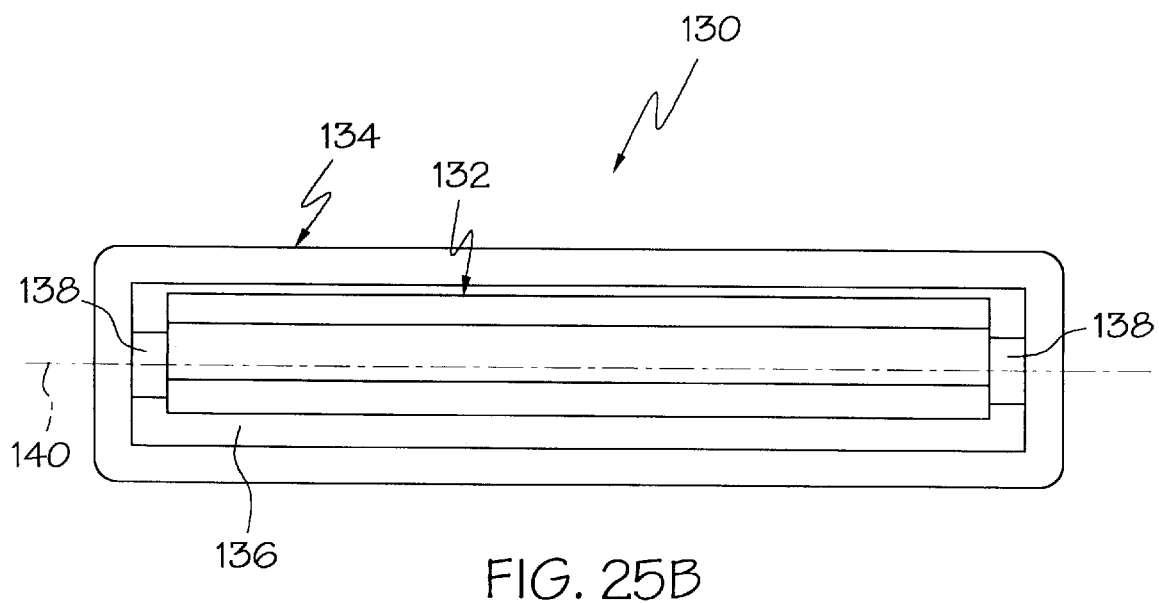
FIG. 25B is an elevational, cross-sectional view of a longitudinal portion of the embodiment of FIG. 25A.

As shown in FIGS. 25A and 25B, in yet another alternate embodiment of the present invention 130, a substantially cylindrical magnet 132 is mounted for rotation within a coil 134 wound to form a cavity 136 therein. The rotor bearings 138 are mounted to the magnet on a rotational axis 140 which is off-center with respect to the magnet 132, and therefore, the magnet's center of mass will be positioned radially distal from the rotational axis 140 provided by the rotor bearings 138.

Source code for operating the controller of FIG. 19, discussed above is as follows:

```
c:\mplab\up12c508.inc        Copyright 1998 John L. Myers                Page    1
Printed 20:41 24 Mar ;*********************************
;* filename up12c508.inc         *
;* header file for PIC 12C508    *
;* by John L. Myers   9706281148 *
;*********************************

; register definitions
;*********************************
W               EQU     H'0000'     ; working register
F               EQU     H'0001'     ; file    register
;*********************************

;* special registers *
;*********************
INDF            EQU     H'0000'     ; indirect file register
TMR0            EQU     H'0001'     ; timer 0
PCL             EQU     H'0002'     ; program counter low byte
STATUS          EQU     H'0003'     ; status register
; STATUS bits
;*********************************
;       RW-0  RW-0  RW-0   R-1      R-1  RW-x  RW-x  RW-x
;       |-----------------------||-----------------------|
;       |GPWUF| --- | PA0 | TO_ ||| PD_ |  Z  |  DC |  C |
;       |-----------------------||-----------------------|
;                          0
;
GPWUF           EQU     H'0007'     ; GPIO reset bit    (1 = wake up from sleep)
PA0             EQU     H'0005'     ; page select       (0 for 12C508)
TO_             EQU     H'0004'     ; WDT time-out
PD_             EQU     H'0003'     ; power-down
Z               EQU     H'0002'     ; zero
DC              EQU     H'0001'     ; digit carry
C               EQU     H'0000'     ; carry
;*********************************

FSR             EQU     H'0004'     ; file-select register/indirect mem pointer
; FSR bits
;*********************************
;        1     1     1    RW-x     RW-x  RW-x  RW-x  RW-x
;       |-----------------------||-----------------------|
;       | --- | --- | --- |FSR4 ||FSR3 |FSR2 |FSR1 |FSR0 |
;       |-----------------------||-----------------------|
;*********************************
```

-23-

```
c:\mplab\up12c508.inc         Copyright 1998 John L. Myers          Page    2
Printed 20:41 24 Mar 98

OSCCAL          EQU     H'0005'      ; oscillator calibration register
; OSCCAL bits
;********************************
;          RW-x  RW-x  RW-x  RW-x
;         |------------------------||------------------------|
;         |CAL7 |CAL6 |CAL5 |CAL4  || --- | --- | --- | ---  |
;         |------------------------||------------------------|
;
CAL7            EQU     H'0007'      ;
CAL6            EQU     H'0006'      ;
CAL5            EQU     H'0005'      ;
CAL4            EQU     H'0004'      ;
;********************************

GPIO            EQU     H'0006'      ; general purpose I/O register
; GPIO bits
;********************************
;                      RW-x  RW-x   RW-x  RW-x  RW-x  RW-x
;         |------------------------||------------------------|
;         | --- | --- | GP5 | GP4  || GP3 | GP2 | GP1 | GP0  |
;         |------------------------||------------------------|
GP5             EQU     H'0005'      ;
GP4             EQU     H'0004'      ;
GP3             EQU     H'0003'      ;
GP2             EQU     H'0002'      ;
GP1             EQU     H'0001'      ;
GP0             EQU     H'0000'      ;
;
; TRIS bits
;*********
;                       W-1   W-1    W-1   W-1   W-1   W-1
;         |------------------------||------------------------|
;         | --- | --- |TRIS5|TRIS4 ||TRIS3|TRIS2|TRIS1|TRIS0 |
;         |------------------------||------------------------|
;
; control for GPIO, 1 = input, 0 = output, write with TRIS f
;****************************

;* end   special registers *
;***********************
```

-24-

```
c:\mplab\up12c508.inc        Copyright 1998 John L. Myers        Page    3
Printed 20:41 24 Mar 00

; OPTION bits
;********************************
;        W-1   W-1   W-1   W-1    W-1   W-1   W-1   W-1
;       |-----------------------||-----------------------|
;       |GPWU_|GPPU_|T0CS |T0SE ||  PSA | PS2 | PS1 | PS0 |
;       |-----------------------||-----------------------|
;
GPWU_           EQU     H'0007'   ; wake up on pin change  (GP0, GP1, GP3)
GPPU_           EQU     H'0006'   ; enable weak pull-ups   (GP0, GP1, GP3)
T0CS            EQU     H'0005'   ; T0 clock source        (0 for int clock)
T0SE            EQU     H'0004'   ; T0 source edge         (0 for inc on L>H)
PSA             EQU     H'0003'   ; prescaler assignment   (0 assigns to T0)
PS2             EQU     H'0002'   ; prescaler setting      (011 for div by 16)
PS1             EQU     H'0001'   ; current design uses 4 MHz INTRC
PS0             EQU     H'0000'   ; divide by 2^(n+1) for TMR0, 2^n for WDT
;********************************

; RAM definition
;********************************
               __MAXRAM H'001F'   ;
;********************************

; Configuration Bits
;********************************
_MCLRE_ON       EQU     H'0FFF'   ;
_MCLRE_OFF      EQU     H'0FEF'   ;
_CP_ON          EQU     H'0FF7'   ;
_CP_OFF         EQU     H'0FFF'   ;
_WDT_ON         EQU     H'0FFF'   ;
_WDT_OFF        EQU     H'0FFB'   ;
_LP_OSC         EQU     H'0FFC'   ;
_XT_OSC         EQU     H'0FFD'   ;
_IntRC_OSC      EQU     H'0FFE'   ;
_ExtRC_OSC      EQU     H'0FFF'   ;
;********************************

; define reset vector
;********************************
RESET           EQU     H'01FF'   ; roll over to H'0000' with OSCCAL
;********************************

;************************
;* end PIC 12C508 header *
;************************
```

```
c:\mplab\ddrvh0yy.asm        Copyright 1998 John L. Myers            Page    1
Printed 20:42 24 Mar ;********************************
;* filename ddrvh0yy.asm        *
;* header file for ddrivexx.asm *
;* by John L. Myers  9803172240 *
;********************************
;
; option register initialization
;********************************
; OPTION bits
;********************************
;           W-1    W-1    W-1    W-1     W-1    W-1    W-1    W-1
;          -------------------------    -------------------------
;         |GPWU_|GPPU_|T0CS |T0SE |    | PSA | PS2 | PS1 | PS0 |
;          -------------------------    -------------------------
;           1      0      0      0       0      0      1      1
;
; GPWU_       EQU     H'0007'      ; wake up on pin change  (GP0, GP1, GP3)
; GPPU_       EQU     H'0006'      ; enable weak pull-ups   (GP0, GP1, GP3)
; T0CS        EQU     H'0005'      ; T0 clock source        (0 for int clock)
; T0SE        EQU     H'0004'      ; T0 source edge         (0 for inc on L>H)
; PSA         EQU     H'0003'      ; prescaler assignment   (0 assigns to T0)
; PS2         EQU     H'0002'      ; prescaler setting      (011 for div by 16)
; PS1         EQU     H'0001'      ; current design uses 4 MHz INTRC
; PS0         EQU     H'0000'      ; divide by 2^(n+1) for TMR0, 2^n for WDT
;
OPT_INI       EQU     H'0083'      ;
;********************************
;
; GPIO configuration
;********************************
;                          RW-x   RW-x    RW-x   RW-x   RW-x   RW-x
;          -------------------------    -------------------------
;         | --- | --- | GP5 | GP4 |    | GP3 | GP2 | GP1 | GP0 |
;          -------------------------    -------------------------
;                                                 DRVR_  DRVF_
;                    >      >      <       >      >      >
;
DRVR_         EQU     H'0001'      ; driver output reverse, active low
DRVF_         EQU     H'0000'      ; driver output forward, active low
;
GPIO_CFG      EQU     H'0008'      ; general purpose port I/O configuration
;********************************
```

-26- c:\mplab\ddrvh0yy.asm        Copyright 1998 John L. Myers                Page    2
Printed 20:42 24 Mar 00

```
;* user registers *
;******************
CTR0            EQU     H'0007'     ; program counter 0
CTR1            EQU     H'0008'     ; program counter 1
T_OFFSET        EQU     H'0009'     ; look-up table offset
ON_COUNT        EQU     H'000A'     ; counter for on pulses
;******************************
;
; configuration register initialization
;****************************************
; CONFIGURATION bits (12)
;******************************
;
;   --------------------||---------------------||------------------------|
;   - | --- | --- | --- || --- | --- | --- |MCLRE||  CP_ |WDTE |FOSC1|FOSC0|
;   --------------------||---------------------||------------------------|
;
MCLRE           EQU     H'0004'     ; MCLR_ pin enable
CP_             EQU     H'0003'     ; code protect negative enable
WDTE            EQU     H'0002'     ; watch dog timer enable
FOSC1           EQU     H'0001'     ; 00 = LP oscillator   01 = XT oscillator
FOSC0           EQU     H'0000'     ; 10 = int RC osc      11 = ext RC osc
;********************************
;
;* miscellaneous
;********************************
NUM_PULSES      EQU     H'0028'     ; number of look-up table entries, even
ON_PULSES       EQU     H'0022'     ; number of on pulses < above
;********************************
;
;************************
;* end of hdrive header *
;************************
``` c:\mplab\ddrvs0yy.asm       Copyright 1998 John L. Myers         Page    1
Printed 21:09 24 Mar

```
;************************************
;* ddrivexx.asm page 0 subroutines  *
;************************************
        ORG     H'0000'

; rollover from 12C508 reset vector
;************************************
        MOVWF   OSCCAL          ; use oscillator trim
        GOTO    MAIN            ; begin program
;********************************
;
; sweep half-period delay time
;********************************
DELAY
        ; get delay value from table
        ;**********************
        MOVF    T_OFFSET, W     ;
        CALL    DELAY_TABLE     ;
        ;
        ; implement the delay
        ;**********************
        ; load counter
        MOVWF   CTR1            ; load counter high byte
LOAD_CTR1
        MOVLW   41H             ; load counter low byte
        MOVWF   CTR0            ;
        ;
        ; cycles = T_HIGH * (T_LOW * 3 + 5), use T_LOW = 41H for 200 usec
COUNT
        DECFSZ  CTR0, F         ;
        GOTO    COUNT           ;
        NOP                     ; to make last cycles = 3 also
        DECFSZ  CTR1, F         ;
        GOTO    LOAD_CTR1       ;
        ;
        DECF    T_OFFSET, F     ; point to next table value
        DECF    ON_COUNT, F     ; count on pulses
        ;
        ; return to main program
        RETLW   00H             ;
;********************************
;
```

-28- c:\mplab\ddrvs0yy.asm     Copyright 1998 John L. Myers               Page    2
Printed 21:09 24 Mar

```
        ; table of half-period delays
        ;************************
DELAY_TABLE                     ; number of entries must be even
        ADDWF   PCL, F          ; jump to table entry
        NOP                     ; add NOP for automatic increment by 1
        RETLW   00H             ; 40, off times, 00H = 256
        RETLW   00H             ; 39
        RETLW   00H             ; 38
        RETLW   00H             ; 37
        RETLW   00H             ; 36
        RETLW   00H             ; 35
        RETLW   22H             ; 34, forward and reverse on times
        RETLW   22H             ; 33
        RETLW   22H             ; 32
        RETLW   23H             ; 31
        RETLW   23H             ; 30
        RETLW   23H             ; 29
        RETLW   24H             ; 28
        RETLW   24H             ; 27
        RETLW   25H             ; 26
        RETLW   25H             ; 25
        RETLW   26H             ; 24
        RETLW   27H             ; 23
        RETLW   27H             ; 22
        RETLW   28H             ; 21
        RETLW   29H             ; 20
        RETLW   2AH             ; 19
        RETLW   2BH             ; 18
        RETLW   2CH             ; 17
        RETLW   2DH             ; 16
        RETLW   2FH             ; 15
        RETLW   31H             ; 14
        RETLW   33H             ; 13
        RETLW   35H             ; 12
        RETLW   38H             ; 11
        RETLW   3BH             ; 10
        RETLW   3FH             ; 9
        RETLW   43H             ; 8
        RETLW   49H             ; 7
        RETLW   51H             ; 6
        RETLW   5BH             ; 5
        RETLW   69H             ; 4
        RETLW   7EH             ; 3
        RETLW   0A3H            ; 2
        RETLW   0FAH            ; 1
        ;************************
        ;
; fill remaining space with NOP'S
;********************************
        FILL    (NOP), (0FF-$)  ;
        GOTO    MAIN            ;
;********************************
;
; end of subroutine page 0
```

-29- c:\mplab\ddrvp0yy.asm     Copyright 1998 John L. Myers            Page    1
Printed 20:53 24 Mar

```
;*******************************
;* filename ddrvp0xx.asm       *
;* hdrivexx.asm program page 0 *
;* by John L. Myers 9803032225 *
;*******************************
;
; start program page 0

ORG    H'0100'

MAIN
;*******************************
        ; initialize
        ;***********************
        MOVLW  OPT_INI           ; option settings -> option register
        OPTION                   ;
        MOVLW  B'00000011'       ; initialize GPIO
        MOVWF  GPIO              ;
        MOVLW  GPIO_CFG          ; configure GPIO
        TRIS   GPIO              ;
        ;***********************

; drive vibrator, sweep the frequency
        ;***********************
LOAD_CTRS                        ; start a sweep
        MOVLW  NUM_PULSES        ; load table pointer
        MOVWF  T_OFFSET          ;
        MOVLW  ON_PULSES-1       ; load on-pulse counter
        MOVWF  ON_COUNT          ;
        ;
OUTPUT_DRIVE                     ; start a cycle
        MOVLW  B'00000010'       ; turn forward pulse on
        BTFSC  ON_COUNT, 7       ; turn off if > number of pulses
        MOVLW  B'00000011'       ;
        MOVWF  GPIO              ;
        CALL   DELAY             ; delay for forward pulse
        MOVLW  B'00000011'       ; output driver off-time
        MOVWF  GPIO              ;
        MOVLW  0AH               ; load CTR0
        MOVWF  CTR0              ;
COUNT_OFF1
        DECFSZ CTR0, F           ;
        GOTO   COUNT_OFF1        ;
        NOP                      ; add 4 NOP's for = off times
        NOP                      ;
        NOP                      ;
        NOP                      ;
        MOVLW  B'00000001'       ; turn reverse pulse on
        BTFSC  ON_COUNT, 7       ; turn off if > number of pulses
        MOVLW  B'00000011'       ;
```

```
c:\mplab\ddrvp0yy.asm         Copyright 1998 John L. Myers              Page    2
Printed 20:53 24 Mar MOVWF   GPIO                ;
        CALL    DELAY               ; delay for reverse pulse
        MOVLW   B'00000011'         ; output driver off-time
        MOVWF   GPIO                ;
        MOVLW   0AH                 ; load CTR0
        MOVWF   CTR0                ;
;
COUNT_OFF2
        DECFSZ  CTR0, F             ;
        GOTO    COUNT_OFF2          ;
        MOVF    T_OFFSET, F         ; test for end of sweep
        BTFSS   STATUS, Z           ;
        GOTO    OUTPUT_DRIVE        ; repeat the cycle
        GOTO    LOAD_CTRS           ; repeat the sweep
        ;*************************
;*******************************
; end MAIN
;
; fill remaining space with NOP'S
;*******************************
        FILL    (NOP), (H'01FF'-$);
;*******************************
;
;PIC12C508 reset vector
;*******************************
        MOVLW   H'0CD0'             ; unit #1 OSCAL trim value
        MOVLW   H'0CC0'             ; unit #2 OSCAL trim value
        MOVLW   H'0CA0'             ; unit #3 OSCAL trim value
        MOVLW   H'0CC0'             ; unit #4 OSCAL trim value
;******************************* end program page 0
```

Following from the above description, it should be apparent to those of ordinary skill in the art that, while the designs and operations herein described constitute several embodiments of the present invention, it is to be understood that the invention is not limited to these precise designs and operations, and that changes may be made therein without departing from the scope of the invention as recited in the following claims.

What is claimed is:

1. a vibrational transducer comprising:
   a coil wound in a longitudinal direction to enclose a chamber extending in the longitudinal direction;
   a switching power source, operatively coupled to the coil, for producing an oscillating magnetic field within the chamber;
   a rotor assembly extending within the chamber, the rotor assembly including a permanent magnet, the rotor assembly having a rotational axis and a center of mass, the center of mass being located radially distal from the rotational axis the magnet having a direction of magnetization; and
   a magnetically susceptible object positioned in close proximity to the coil, mis-aligning the magnet's direction of magnetization with a longitudinal axis of the coil when the switching power source is not active.

2. The vibrational transducer of claim 1, wherein the switching power source includes:
   a controller for controlling production of switching power; and
   a comparator operatively coupled to the coil for detecting a longitudinal component of the magnet's travel, and for generating a directional signal indicative of the longitudinal component detected, the directional signal being sent to the controller;
   wherein the controller controls the production of switching power responsive to the directional signal.

3. The vibrational transducer of claim 2, wherein the controller is a microprocessor.

4. The vibrational transducer of claim 1, wherein the rotor is journaled on a pair of sleeve bearings mounted within the chamber to opposing walls formed by the coil.

5. The vibrational transducer of claim 1, further comprising a planar substrate material bonded to an outer wall formed by the coil.

6. The vibrational transducer of claim 5, wherein the substrate is an epoxy-glass substrate.

7. The vibrational transducer of claim 5, wherein the substrate is adapted to be surface mounted to a printed circuit board.

8. The vibrational transducer of claim 7, wherein the switching power source includes:
   a controller for controlling production of switching power; and
   a comparator operatively coupled to the coil for detecting a longitudinal component of the magnet's travel, and for generating a directional signal indicative of the longitudinal component detected, the directional signal being sent to the controller;
   wherein the controller controls the production of switching power responsive to the directional signal;
   wherein the controller and the comparator are mounted to the printed circuit board.

9. The vibrational transducer of claim 1, wherein the switching power source includes:
   a controller for controlling the production of switching power; and
   a Hall Effect switch positioned near the magnet for detecting a position of the magnet within the coil and for generating a positional signal indicative of the magnet's position within the coil, the positional signal being sent to the controller;
   wherein the controller controls the production of switching power responsive to the positional signal.

10. The vibrational transducer of claim 1, wherein the switching power source includes an H-bridge circuit operatively coupled to the coil and a controller operatively coupled to the H-bridge circuit.

11. The vibrational transducer of claim 1, wherein the positioning of the magnetically susceptible object mis-aligns the magnet's direction of magnetization with a longitudinal axis of the coil at a substantially 90° angle, when the switching power source is not active, thereby facilitating maximum torque on the magnet upon the application of switching power to the coil.

12. A vibrational transducer comprising:
    a coil wound in a longitudinal direction to enclose a chamber extending in the longitudinal direction;
    a switching power source, operatively coupled to the coil, for producing an oscillating magnetic field within the chambers and
    a rotor assembly extending within the chamber, the rotor assembly including a permanent magnet, the rotor assembly having a rotational axis and a center of mass, the center of mass being located radially distal from the rotational axis;
    wherein the rotor assembly includes a rotor, the magnet is mounted to the rotor, and the magnet has a center of mass located radially distal from the rotational axis; and
    wherein the magnet is substantially semi-cylindrical, the magnet having a hub, and the magnet is mounted to the rotor substantially along its hub.

13. The vibrational transducer of claim 12, wherein the magnet has a radial axis of symmetry normal to the rotational axis and is magnetized in a direction parallel to the radial axis of symmetry.

14. The vibrational transducer of claim 13, wherein the rotor assembly is mounted to the coil within the chamber and the rotational axis is substantially perpendicular to the longitudinal direction.

15. A vibrational transducer comprising:
    a coil wound in a longitudinal direction to enclose a chamber extending in the longitudinal direction;
    a switching power source, operatively coupled to the coil, for producing an oscillating magnetic field within the chamber; and
    a rotor assembly extending within the chamber, the rotor assembly including a permanent magnet, the rotor assembly having a rotational axis and a center of mass, the center of mass being located radially distal from the rotational axis;
    wherein the coil is a bifilar wound coil.

16. A vibrational transducer comprising:
    a coil wound in a longitudinal direction to enclose a chamber extending in the longitudinal direction;
    a switching power source, operatively coupled to the coil, for producing an oscillating magnetic field within the chamber; and
    a rotor assembly extending within the chamber, the rotor assembly including a permanent magnet, the rotor assembly having a rotational axis and a center of mass, the center of mass being located radially distal from the rotational axis;

wherein the switching power source includes a swept frequency driver circuit operatively coupled to the coil.

17. The vibrational transducer of claim 16, wherein the swept frequency driver circuit is a dual-input swept frequency driver circuit.

18. The vibrational transducer of claim 16, wherein the swept frequency driver circuit is a single-input swept frequency driver circuit.

19. The vibrational transducer of claim 16, wherein the swept frequency driver circuit is programmed to sweep a half-period of output switching from a first half-period to a second half-period following an exponential sweep envelope.

20. The vibrational transducer of claim 19, wherein the swept frequency driver circuit is further programmed to cease output switching for a predetermined period of time between each sweep.

21. The vibrational transducer of claim 20, wherein the first frequency is approximately 10 Hz and the second frequency is approximately 74 Hz.

22. The vibrational transducer of claim 19, wherein the swept frequency driver circuit is programmed to sweep the frequency of output switching from a first frequency to a second frequency, the first frequency being sufficiently low so as to be able to start rotation of the rotor from a rest position.

23. A vibrational transducer comprising:

a coil wound in a longitudinal direction to enclose a chamber extending in the longitudinal direction;

a switching power source, operatively coupled to the coil, for producing an oscillating magnetic field within the chamber; and a rotor assembly positioned within the chamber and including a rotor and a permanent magnet mounted to the rotor, the rotor assembly having a rotational axis and a center of mass located radially distal from the rotational axis, the magnet having a direction of magnetization; and a means for mis-aligning the magnet's direction of magnetization with the longitudinal direction of the coil when the switching power source is not active.

24. A vibrational transducer comprising:

a coil wound in a longitudinal direction to enclose a chamber extending in the longitudinal direction;

a switching power source, operatively coupled to the coil, for producing an oscillating magnetic field within the chamber; and a rotor mounted for rotation within the chamber, the rotor including a permanent magnet, the rotor having a rotational axis and a center of mass, the center of mass being located radially distal from the rotational axis;

the shape of the rotor being at least partially cylindrical, wherein the rotational axis is parallel to the cylindrical axis of the rotor.

25. The vibrational transducer of claim 24, wherein the height of the rotor is shorter than the diameter of the rotor.

* * * * *